United States Patent
Kawabata et al.

(10) Patent No.: US 11,710,841 B2
(45) Date of Patent: Jul. 25, 2023

(54) REACTION DEVICE AND FUEL CELL POWER GENERATION SYSTEM

(71) Applicant: TOKYO GAS CO., LTD., Tokyo (JP)

(72) Inventors: Yasuharu Kawabata, Tokyo (JP); Yoshio Matsuzaki, Tokyo (JP); Koki Sato, Tokyo (JP)

(73) Assignee: TOKYO GAS CO., LTD., Tokyo (JP)

( * ) Notice: Subject to any disclaimer, the term of this patent is extended or adjusted under 35 U.S.C. 154(b) by 209 days.

(21) Appl. No.: 17/424,378

(22) PCT Filed: Jan. 20, 2020

(86) PCT No.: PCT/JP2020/001750
§ 371 (c)(1),
(2) Date: Jul. 20, 2021

(87) PCT Pub. No.: WO2020/153306
PCT Pub. Date: Jul. 30, 2020

(65) Prior Publication Data
US 2022/0077482 A1    Mar. 10, 2022

(30) Foreign Application Priority Data
Jan. 22, 2019   (JP) ................................ 2019-008561

(51) Int. Cl.
*H01M 8/0662*     (2016.01)
*B01D 53/22*      (2006.01)
(Continued)

(52) U.S. Cl.
CPC ........ *H01M 8/0681* (2013.01); *B01D 53/228* (2013.01); *B01D 71/024* (2013.01);
(Continued)

(58) Field of Classification Search
CPC .......... H01M 8/0681; H01M 8/04097; H01M 8/0668; C01B 32/05; B01D 53/228; B01D 71/024
See application file for complete search history.

(56) References Cited

U.S. PATENT DOCUMENTS

2005/0014038 A1    1/2005   Aoyama et al.
2006/0019138 A1    1/2006   Jansen et al.
(Continued)

FOREIGN PATENT DOCUMENTS

| JP | B 3334567    | 10/2002 |
| JP | 2005-327586  | 11/2005 |

(Continued)

OTHER PUBLICATIONS

Chinese First Office Action (w/ English translation) for corresponding Chinese Application No. 202080009900.6, dated Jul. 18, 2022, 20 pages.
(Continued)

*Primary Examiner* — Matthew J Merkling
(74) *Attorney, Agent, or Firm* — Dority & Manning, P.A.

(57) ABSTRACT

A reaction device comprising:
a first flow path to which a fuel gas is supplied;
a second flow path to which a gas containing oxygen is supplied;
a hydrogen permeable membrane that separates the first flow path and the second flow path and allows hydrogen contained in the fuel gas supplied to the first flow path to permeate toward the second flow path; and
a catalyst that is provided in the second flow path and promotes oxidation reaction between the oxygen and hydrogen passing through the hydrogen permeable membrane, (Continued)

wherein the hydrogen permeable membrane comprises a barium zirconium oxide membrane.

20 Claims, 8 Drawing Sheets

(51) Int. Cl.
*B01D 71/02* (2006.01)
*H01M 8/04089* (2016.01)
*H01M 8/0668* (2016.01)
*C01B 32/05* (2017.01)

(52) U.S. Cl.
CPC ......... *C01B 32/05* (2017.08); *H01M 8/04097* (2013.01); *H01M 8/0668* (2013.01)

(56) References Cited

U.S. PATENT DOCUMENTS

| | | |
|---|---|---|
| 2010/0031822 A1 | 2/2010 | Song et al. |
| 2010/0129284 A1 | 5/2010 | Niitsuma et al. |
| 2015/0263355 A1* | 9/2015 | Hiraiwa ............ H01M 8/04731 |
| | | 429/434 |
| 2016/0204446 A1 | 7/2016 | Higashino et al. |
| 2021/0388515 A1* | 12/2021 | Ding ................... C25B 11/0773 |

FOREIGN PATENT DOCUMENTS

| | | |
|---|---|---|
| JP | 2006054170 | 2/2006 |
| JP | 2007021416 | 2/2007 |
| JP | A 2012-164423 | 8/2012 |
| JP | B 5137199 | 2/2013 |
| JP | A 2013-196890 | 9/2013 |
| JP | B 5581240 | 8/2014 |

OTHER PUBLICATIONS

Zhang et al., "External short circuit-assisted proton conducting ceramic membrane for H2 permeation",Ceramics International, vol. 40, Jan. 2014, pp. 791-797.

International Search Report (w/ English Translation) and Written Opinion for corresponding PCT Application No. PCT/JP2020/001750 dated Mar. 24, 2020, 11 pages.

Korean Office Action (w/ English translation) for corresponding Application No. 10-2021-7024548, dated Feb. 3, 2023, 6 Pages.

* cited by examiner

PHASE DIAGRAM OF CARBON DIOXIDE GAS

REACTION DEVICE AND FUEL CELL POWER GENERATION SYSTEM

CROSS-REFERENCE TO RELATED APPLICATIONS

The present application is related and has right of priority to JP 2019-008561, which was filed on Jan. 22, 2019 in the Japanese Patent Office, and is a U.S. national phase entry of PCT/JP2020/001750, which was filed on Jan. 20, 2020, both of which are incorporated by reference in their entireties for all purposes.

TECHNICAL FIELD

The present invention relates to a reaction device and a fuel cell power generation system.

BACKGROUND ART

In a fuel cell power generation system, when a carbon compound fuel is used, carbon dioxide gas is contained in exhaust gas discharged from a fuel cell. It is considered to separate the carbon dioxide gas from the exhaust gas (see, for example, Patent Literatures 1 to 5).
Patent Literature 1: Japanese Patent No. 5581240
Patent Literature 2: Japanese Patent Application Laid-Open (JP-A) No. 2013-196890
Patent Literature 3: Japanese Patent No. 5137199
Patent Literature 4: Japanese Patent Application Laid-Open (JP-A) No. 2012-164423
Patent Literature 5: Japanese Patent No. 3334567

SUMMARY OF INVENTION

Technical Problem

When the carbon dioxide gas is liquefied into liquefied carbon dioxide, transportation, press-fitting and fixing into a reservoir, and commercial and industrial utilization are facilitated.

Since the exhaust gas contains gas (impurities) other than the carbon dioxide gas, it is necessary to remove the gas other than the carbon dioxide gas in order to obtain liquefied carbon dioxide with less impurities. Although there is an apparatus that obtains a high concentration of carbon dioxide gas by reacting an unreacted component of exhaust gas with oxygen, it is desired to promote the reaction when the carbon dioxide gas is obtained.

It is known that carbon is produced from the separated carbon dioxide gas and stored in order not to release the carbon dioxide gas to the atmosphere. A carbon production apparatus that produces carbon by reacting (reduction reaction) carbon dioxide gas and hydrogen in the presence of a catalyst is known (see, for example, Patent Literature 5). From the viewpoint of efficiently obtaining the carbon dioxide gas used for the reduction reaction, it is desired to promote the reaction when the carbon dioxide gas is obtained.

In order to promote the reaction when the carbon dioxide gas is obtained, oxygen may be selectively separated from gas containing oxygen using an oxygen permeable membrane, and the separated oxygen and an unreacted component of the exhaust gas may be oxidized to generate carbon dioxide. At this time, as the oxygen permeable membrane, a mixed conductive ceramic membrane containing LSCF (compound composed of La, Sr, Co, Fe and oxygen), BSCF (compound composed of Ba, Sr, Co, Fe and oxygen), and the like is used.

However, when such a mixed conductive ceramic membrane is used, carbon dioxide contained in the exhaust gas or carbon dioxide generated by oxidation of oxygen and the unreacted component of the exhaust gas reacts with LSCF, BSCF, and the like, and carbonate is generated and accumulated on the mixed conductive ceramic membrane, so that oxygen permeability in the oxygen permeable membrane may be significantly reduced. As a result, when such a mixed conductive ceramic membrane is used, a high concentration of carbon dioxide gas may not be obtained.

Thus, as a method of separating the carbon dioxide gas, there is also a method in which hydrogen is selectively separated from a hydrogen-containing fuel electrode off-gas using a hydrogen permeable membrane having high carbon dioxide resistance to generate a high concentration of carbon dioxide gas, and the separated hydrogen reacts with oxygen in air electrode gas.

As the hydrogen permeable membrane, a membrane capable of realizing high hydrogen transport characteristics is required.

An embodiment of the present invention has been made in view of the above, and an object of the present invention is to provide a reaction device equipped with a hydrogen permeable membrane having excellent hydrogen permeability and promoting oxidation reaction of an unreacted component of fuel gas, and a fuel cell power generation system including the reaction device.

Solution to Problem

<1> A reaction device including: a first flow path to which a fuel gas is supplied; a second flow path to which a gas containing oxygen is supplied; a hydrogen permeable membrane that separates the first flow path and the second flow path and allows hydrogen contained in the fuel gas supplied to the first flow path to permeate toward the second flow path; and a catalyst that is provided in the second flow path and promotes an oxidation reaction between the oxygen and hydrogen passing through the hydrogen permeable membrane, in which the hydrogen permeable membrane includes a barium zirconium oxide membrane.

According to the configuration of <1>, by using the barium zirconium oxide membrane, generation and accumulation of carbonate due to reaction between carbon dioxide and a membrane component are suppressed as compared with the case of using a ceramic membrane containing LSCF (compound composed of La, Sr, Co, Fe and oxygen), BSCF (compound composed of Ba, Sr, Co, Fe and oxygen), and the like, and therefore, there is a tendency to exhibit excellent carbon dioxide resistance. In addition, since the hydrogen permeable membrane includes the barium zirconium oxide membrane, an inside of the hydrogen permeable membrane has a characteristic of being in an internal short-circuit state, and therefore, while the hydrogen permeable membrane has high hydrogen permeability, a decrease in hydrogen permeability in the hydrogen permeable membrane can be suppressed. When carbon monoxide and water vapor are contained in the fuel gas, hydrogen is selectively separated to change chemical equilibrium, and the water vapor and carbon monoxide in the fuel gas cause a shift reaction to change into carbon dioxide and hydrogen, so that the carbon monoxide in the fuel gas also changes into carbon dioxide. Thus, it is also possible to efficiently concentrate carbon dioxide by separating hydrogen in the fuel gas to the second flow path side. In the configuration of <1>, the fuel gas may be a fuel electrode off-gas discharged from a fuel electrode and containing unreacted fuel gas, and the gas containing oxygen may be an air electrode off-gas discharged from an air electrode and containing unreacted oxygen. The fuel gas may contain carbon dioxide.

<2> The reaction device according to <1>, in which the barium zirconium oxide membrane is a membrane obtained by doping barium zirconium oxide with at least one metal oxide containing at least one metal selected from the group consisting of yttrium (Y), ytterbium (Yb), selenium (Se), strontium (Sr), scandium (Sc), gadolinium (Gd), and indium (In).

According to the configuration of <2>, in the barium zirconium oxide membrane, the effect that high durability and high hydrogen transport characteristics can be achieved can be provided.

<3> The reaction device according to <2>, in which a molar ratio (barium zirconium oxide/metal constituting metal oxide) of the barium zirconium oxide to the metal constituting the metal oxide in the barium zirconium oxide membrane is from 70/30 to 90/10.

According to the configuration of <3>, in the barium zirconium oxide membrane, when the molar ratio is 70/30 or more, high chemical stability can be achieved, and when the molar ratio is 90/10 or less, high hydrogen transport characteristics can be achieved.

<4> The reaction device according to any one of <1> to <3>, in which in the barium zirconium oxide membrane, a surface on a side of the first flow path and a surface on a side of the second flow path are electrically short-circuited.

<5> The reaction device according to <4>, in which the barium zirconium oxide membrane has a microvia structure penetrating the surface on the first flow path side and the surface on the second flow path side, a material having electron conductivity is embedded in the microvia structure, and the surface on the first flow path side and the surface on the second flow path side are internally short-circuited, or the reaction device further includes a current collector on the surface on the first flow path side and the surface on the second flow path side, and the surface on the first flow path side and the surface on the second flow path side are externally short-circuited.

According to the configurations <4> and <5>, the barium zirconium oxide membrane is provided with electron conductivity, and hydrogen supplied to the first flow path side is permeated as hydrogen ions (H') to the second flow path side, whereby the hydrogen permeability can be enhanced.

<6> The reaction device according to any one of <1> to <5>, in which the catalyst is stacked on a second flow path side of the hydrogen permeable membrane.

According to the configuration of <6>, oxygen and hydrogen having permeated the hydrogen permeable membrane can be suitably subjected to oxidation reaction.

<7> A fuel cell power generation system including: the reaction device according to any one of <1> to <6>; and a fuel cell which includes a fuel electrode, an air electrode, and an electrolyte layer disposed between the fuel electrode and the air electrode and in which power is generated by the fuel gas supplied to the fuel electrode and an oxidant gas supplied to the air electrode and containing oxygen, a fuel electrode off-gas containing unreacted fuel gas is discharged from the fuel electrode, and an air electrode off-gas containing oxygen is discharged from the air electrode, in which the fuel electrode off-gas is supplied to the first flow path, and the air electrode off-gas is supplied to the second flow path, and in which in the second flow path of the reaction device, the oxygen and hydrogen passing through the hydrogen permeable membrane undergo an oxidation reaction to generate water, and unreacted hydrogen is separated from the fuel electrode off-gas.

According to the configuration of <7>, the fuel electrode off-gas is supplied to the first flow path of the reaction device, and the air electrode off-gas is supplied to the second flow path of the reaction device. Then, in the reaction device, hydrogen contained in the fuel electrode off-gas permeates through the hydrogen permeable membrane and is supplied to the second flow path side, and subjected to oxidation reaction with oxygen contained in the air electrode off-gas. At this time, a gas having a high carbon dioxide concentration can be obtained.

In addition, when carbon monoxide is also contained in the fuel electrode off-gas, hydrogen is selectively separated to change chemical equilibrium, and water vapor and carbon monoxide in the fuel electrode off-gas cause a shift reaction to be changed into carbon dioxide and hydrogen. Thus, by separating hydrogen in the fuel electrode off-gas to the second flow path side, a gas having a higher carbon dioxide concentration can be efficiently obtained.

<8> The fuel cell power generation system according to <7>, including a plurality of fuel cells, in which fuel electrodes in the plurality of fuel cells are arranged in series, and fuel electrode off-gas discharged from a fuel electrode on a more upstream side is supplied to a fuel electrode on a more downstream side, and in which the fuel electrode off-gas discharged from a fuel electrode on a most downstream side is supplied to the first flow path, and air electrode off-gas discharged from at least any one of air electrodes in the plurality of fuel cells is supplied to the second flow path.

According to the configuration of <8>, the plurality of fuel cells are provided, and the fuel electrode off-gas discharged from the fuel electrode on the more upstream side is supplied to the fuel electrode on the more downstream side and reused, whereby power generation efficiency of the fuel cell power generation system can be improved.

<9> The fuel cell power generation system according to <7> or <8>, further including a water vapor separator that separates water vapor from a gas discharged from the first flow path of the reaction device.

According to the configuration of <9>, since the gas discharged from the first flow path contains water vapor and carbon dioxide as main components, high concentration carbon dioxide can be recovered by separating water vapor from the gas.

<10> The fuel cell power generation system according to any one of <7> to <9>, further including: a power generator that generates power using renewable energy; a water electrolyzer that electrolyzes water using the power generated by power generation in the power generator; and a carbon producer that produces carbon by a reduction reaction between hydrogen produced by the water electrolyzer and carbon dioxide contained in a gas discharged from the first flow path of the reaction device.

According to the configuration of <10>, carbon can be produced by a reduction reaction between the recovered high concentration carbon dioxide and hydrogen ($CO_2$-free hydrogen) derived from renewable energy.

<11> The fuel cell power generation system according to any one of <7> to <10>, further including: a compressor that compresses carbon dioxide contained in a gas discharged from the first flow path of the reaction device; and a liquefaction device that liquefies the carbon dioxide compressed by the compressor.

According to the configuration of <11>, liquefied carbon dioxide can be efficiently obtained from the recovered high concentration carbon dioxide.

Advantageous Effects of Invention

According to an embodiment of the present invention, it is possible to provide a reaction device equipped with a hydrogen permeable membrane having excellent hydrogen permeability and promoting oxidation reaction of an unreacted component of fuel gas, and a fuel cell power generation system including the reaction device.

DESCRIPTION OF EMBODIMENTS

In the present disclosure, the numerical range expressed using " . . . to . . . " means a range including values presented before and after "to" as a lower limit value and an upper limit value.

In numerical ranges described in stages in the present disclosure, the upper limit value or the lower limit value of a numerical range may be replaced with the upper limit value or the lower limit value of a numerical range of a different stage.

First Embodiment

Hereinafter, an example of an embodiment of the present invention will be described in detail with reference to the drawings.

Figure 1:
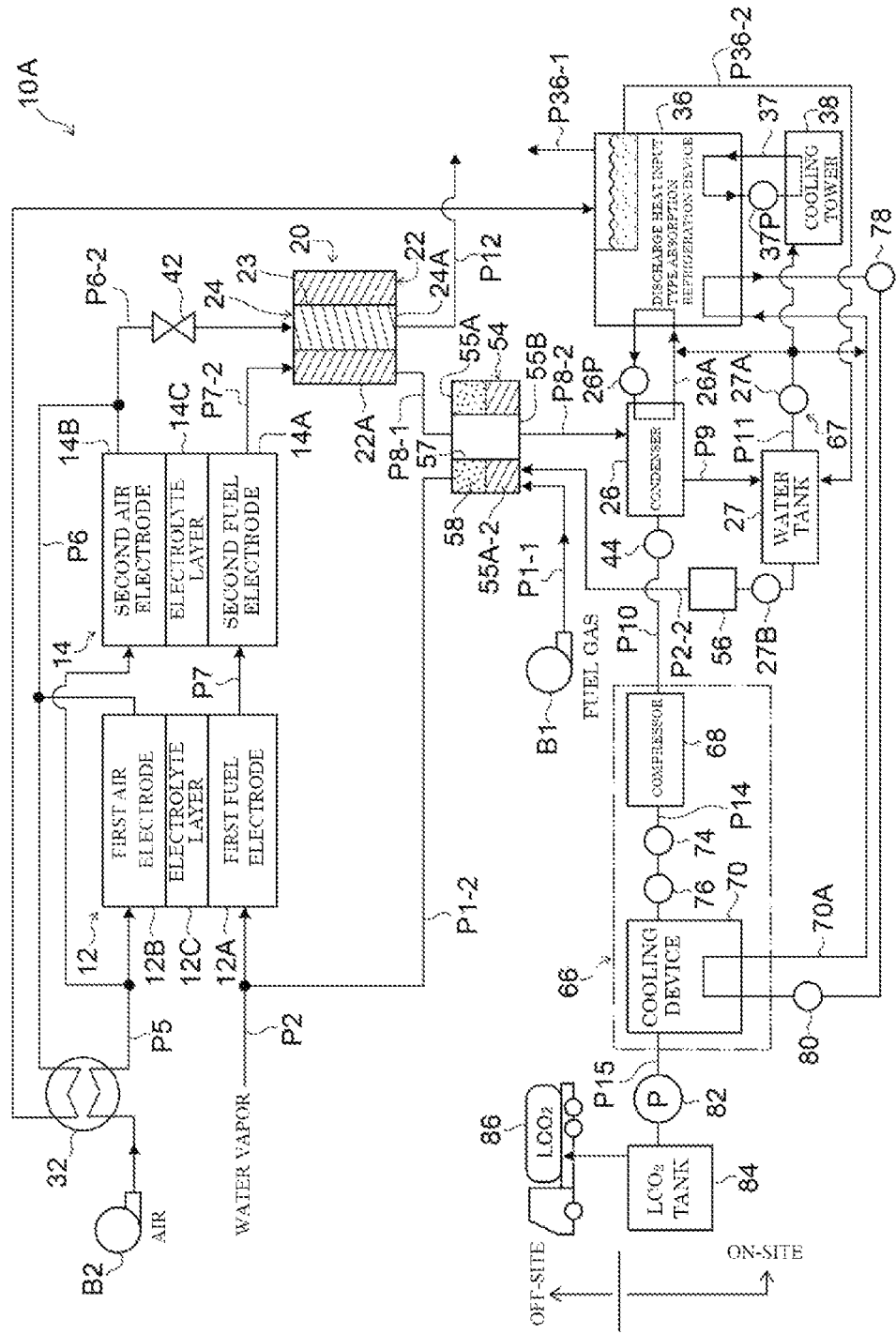
FIG. 1 is a schematic diagram of a fuel cell power generation system according to a first embodiment.

FIG. 1 illustrates a fuel cell power generation system 10A according to a first embodiment of the present invention. The fuel cell power generation system 10A includes, as main components, a first fuel cell stack 12, a second fuel cell stack 14, an oxidation reactor 20 with a hydrogen permeable membrane as a reaction device, a condenser (water vapor separator) 26, a second heat exchanger 32, a discharge heat input type absorption refrigeration device 36, a water tank 27, a carbon dioxide gas liquefier 66, a tank 84, and the like, which are provided on-site. The fuel cell power generation system 10A includes a controller (not illustrated).

As shown in FIG. 1, the first fuel cell stack 12 is a hydrogen ion conduction type solid oxide fuel cell (PCFC: Proton Ceramic Solid Oxide Fuel Cell), and includes an electrolyte layer 12C, and a first fuel electrode (fuel electrode) 12A and a first air electrode (air electrode) 12B respectively stacked on front and back surfaces of electrolyte layer 12C.

A basic configuration of the second fuel cell stack 14 is similar to that of the first fuel cell stack 12. The second fuel cell stack 14 includes a second fuel electrode 14A corresponding to the first fuel electrode 12A, a second air electrode 14B corresponding to the first air electrode 12B, and an electrolyte layer 14C corresponding to the electrolyte layer 12C.

One end of a reformed gas pipe P1-2 is connected to the first fuel electrode 12A of the first fuel cell stack 12, and the other end of a fuel gas pipe P1-1 is connected to a reformer 54 described later. Fuel gas is sent from the reformer 54 to the first fuel electrode 12A. In the present embodiment, although methane is used as the fuel gas, the fuel gas is not particularly limited as long as it is a gas capable of generating hydrogen by reforming, and a hydrocarbon fuel can be used. Examples of the hydrocarbon fuel include natural gas, LP gas (liquefied petroleum gas), biogas, coal reformed gas, and lower hydrocarbon gas. Examples of the lower hydrocarbon gas include lower hydrocarbons having 4 or less carbon atoms such as methane, ethane, ethylene, propane, and butane, and methane used in the present embodiment is preferable. The hydrocarbon fuel may be a mixture of the above-described lower hydrocarbon gas, and the lower hydrocarbon gas may be a gas such as natural gas, city gas, or LP gas. When the fuel gas contains impurities, a desulfurizer or the like is required, but omitted in FIG. 1.

A water vapor pipe P2 is joined and connected to the reformed gas pipe P1-2, and water vapor is sent, if appropriate, from a water vapor source (not illustrated) at the time of start, stop, or the like. Methane and water vapor are merged in the fuel gas pipe P1 and supplied to the first fuel electrode 12A. The water vapor from the water vapor pipe P2 is supplied in a replenishing manner when necessary at the time of starting, stopping, or the like of the fuel cell power generation system 10A.

In the first fuel electrode 12A, the fuel gas is subjected to steam reforming to generate hydrogen and carbon monoxide as expressed by the following formula (1). As expressed by the following formula (2), carbon dioxide and hydrogen are generated by a shift reaction between the generated carbon monoxide and water vapor.

$$CH_4 + H_2O \rightarrow 3H_2 + CO \quad (1)$$

$$CO + H_2O \rightarrow CO_2 + H_2 \quad (2)$$

In the first fuel electrode 12A, hydrogen is separated into hydrogen ions and electrons as expressed by the following formula (3).

(Fuel Electrode Reaction)

$$H_2 \rightarrow 2H^+ + 2e^- \quad (3)$$

The hydrogen ions move to the first air electrode 12B through the electrolyte layer 12C. The electrons move to the first air electrode 12B through an external circuit (not illustrated). Accordingly, electric power is generated in the first fuel cell stack 12. During power generation, the first fuel cell stack 12 generates heat.

An oxidant gas (air) is supplied from an oxidant gas pipe P5 to the first air electrode 12B of the first fuel cell stack 12. Air is introduced into the oxidant gas pipe P5 by an oxidant gas blower B2. The oxidant gas pipe P5 is provided with a second heat exchanger 32, and the air flowing through the oxidant gas pipe P5 is heated by heat exchange with an air electrode off-gas flowing through an air electrode off-gas pipe P6 described later. The heated air is supplied to the first air electrode 12B.

In the first air electrode 12B, as expressed by the following formula (4), hydrogen ions having moved from the first fuel electrode 12A through the electrolyte layer 12C and electrons having moved from the first fuel electrode 12A through the external circuit react with oxygen in the oxidant gas to generate water vapor.

(Air Electrode Reaction)

$$2H^+ + 2e^- + \tfrac{1}{2}O_2 \rightarrow H_2O \qquad (4)$$

The air electrode off-gas pipe P6 is connected to the first air electrode 12B. The air electrode off-gas is discharged from the first air electrode 12B to the air electrode off-gas pipe P6. The oxidant gas pipe P5 and the air electrode off-gas pipe P6 are similarly connected to the second air electrode 14B, and the first air electrode 12B and the second air electrode 14B are connected in parallel.

One end of a first fuel electrode off-gas pipe P7 is connected to the first fuel electrode 12A of the first fuel cell stack 12, and the other end of the first fuel electrode off-gas pipe P7 is connected to the second fuel electrode 14A of the second fuel cell stack 14. The first fuel electrode off-gas is sent from the first fuel electrode 12A to the first fuel electrode off-gas pipe P7. The fuel electrode off-gas contains unreformed fuel gas components, unreacted hydrogen, unreacted carbon monoxide, carbon dioxide, water vapor, and the like.

One end of a second fuel electrode off-gas pipe P7-2 is connected to the second fuel electrode 14A of the second fuel cell stack 14, and the second fuel electrode off-gas is sent from the second fuel electrode 14A. The other end of the second fuel electrode off-gas pipe P7-2 is connected to the oxidation reactor 20 with a hydrogen permeable membrane.

In the second fuel cell stack 14, the same power generation reaction as in the first fuel cell stack 12 is performed, and the air electrode off-gas is sent from the second air electrode 14B to the air electrode off-gas pipe P6. The air electrode off-gas pipe P6 connected to the second air electrode 14B is branched on an upstream side of a junction with the air electrode off-gas pipe P6 connected to the first air electrode 12B, and a branch air electrode off-gas pipe P6-2 is formed. The branch air electrode off-gas pipe P6-2 is provided with a flow rate adjusting valve 42 capable of adjusting a flow rate. The flow rate adjusting valve 42 is connected to the controller. The flow rate adjusting valve 42 is controlled by the controller, and an air electrode off-gas flow rate branching into the branch air electrode off-gas pipe P6-2 is adjusted. A downstream end of the branch air electrode off-gas pipe P6-2 is connected to the oxidation reactor 20 with a hydrogen permeable membrane.

(Oxidation Reactor with Hydrogen Permeable Membrane)

Figure 2:
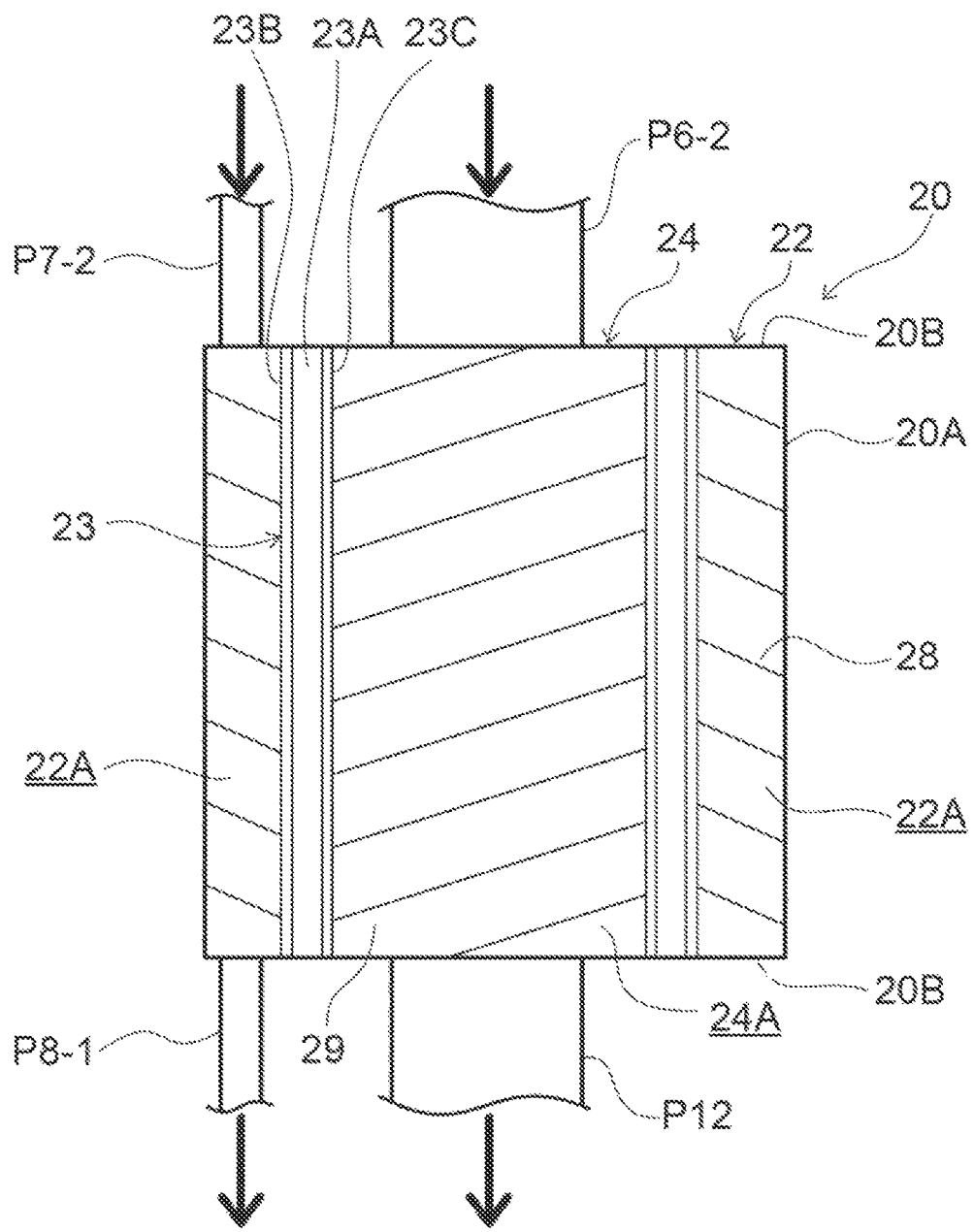
FIG. 2 is a cross-sectional view taken along an axis showing an oxidation reactor with a hydrogen permeable membrane.

As illustrated in FIG. 2, the oxidation reactor 20 with a hydrogen permeable membrane has a multiple cylindrical shape in which the inside is sealed, the multiple cylindrical shape including an outer cylinder 20A, the hydrogen permeable membrane 23 having a cylindrical shape and disposed inside the outer cylinder 20A, and a closing member 20B that closes an opening portion on a cylinder axial direction end side of the outer cylinder 20A and the cylindrical hydrogen permeable membrane 23.

An annular hydrogen separator 22 is provided between the outer cylinder 20A and the hydrogen permeable membrane 23, an inner peripheral side of the cylindrical hydrogen permeable membrane 23 is an oxidation reactor 24, and the hydrogen separator 22 and the oxidation reactor 24 are isolated by the hydrogen permeable membrane 23.

The hydrogen separator 22 includes an outer spiral path forming member 28 having a spiral shape, and a hydrogen separation space 22A having a spiral shape is formed in the cylinder axis direction of the outer cylinder 20A.

As an example, the outer spiral path forming member 28 is formed by spirally forming a belt-shaped member, and has an inner peripheral edge fixed to an outer peripheral surface of the hydrogen permeable membrane 23 and an outer peripheral edge fixed to an inner peripheral surface of the outer cylinder 20A.

The oxidation reactor 24 includes an inner spiral path forming member 29 having a spiral shape, and an air flow path 24A having a spiral shape is formed in the cylinder axis direction of the outer cylinder 20A.

As an example, the inner spiral path forming member 29 is formed by spirally forming a belt-shaped member, and has an outer peripheral edge fixed to an inner peripheral surface of the hydrogen permeable membrane 23. The inner spiral path forming member 29 may have a spiral step shape in which an inner peripheral edge is fixed to an outer peripheral surface of a shaft (not illustrated) provided in a shaft core portion.

Figure 3:
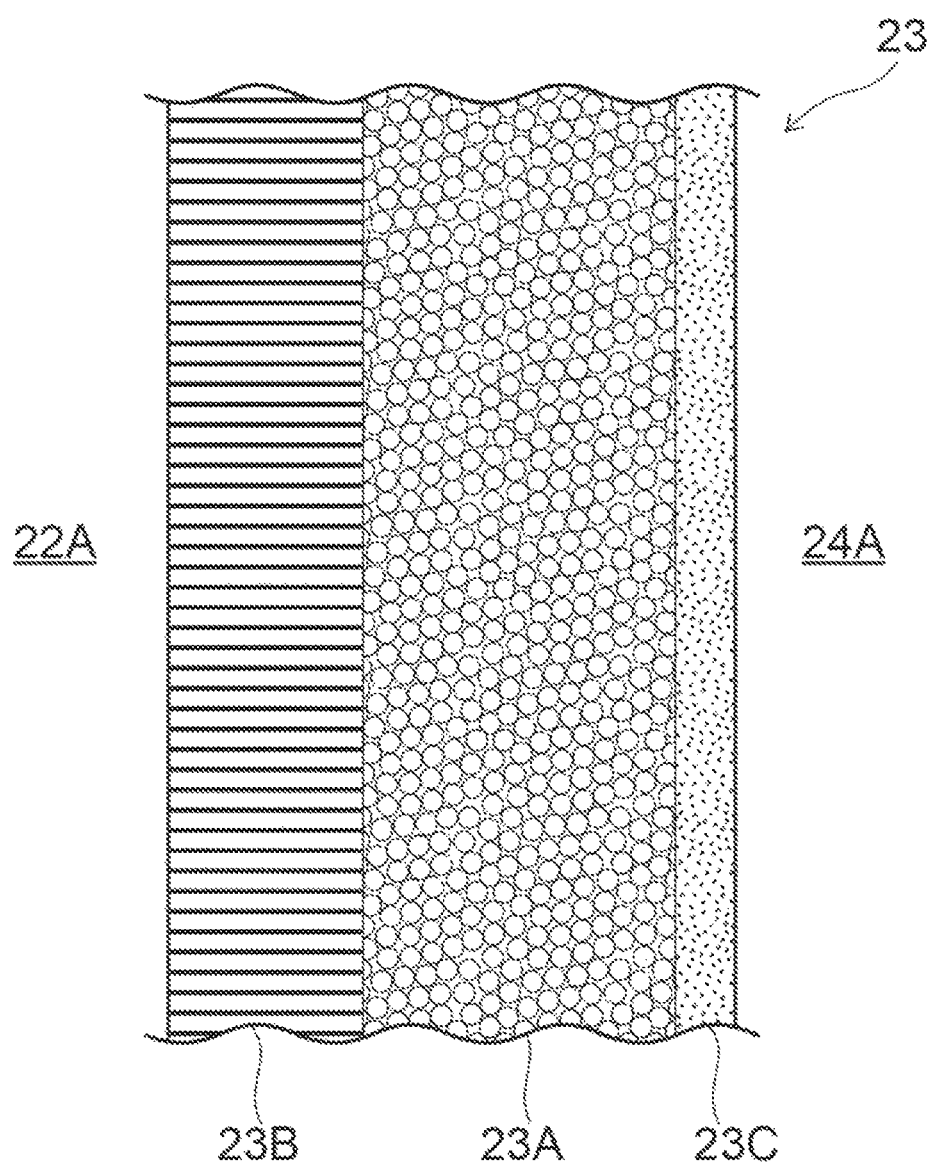
FIG. 3 is an enlarged cross-sectional view showing the hydrogen permeable membrane.

As illustrated in FIGS. 2 and 3, the hydrogen permeable membrane 23 of the present embodiment includes a porous ceramic membrane 23A, a barium zirconium oxide membrane 23B provided on the hydrogen separation space 22A side of the ceramic membrane 23A, and a porous reaction catalyst membrane 23C provided on the air flow path 24A side of the ceramic membrane 23A, and the reaction catalyst membrane 23C, the ceramic membrane 23A, and the barium zirconium oxide membrane 23B are stacked in this order from the oxidation reactor 24 to the hydrogen separator 22. The ceramic membrane 23A and the barium zirconium oxide membrane 23B constitute a high-temperature hydrogen permeable membrane. The ceramic membrane 23A functions as a support for the barium zirconium oxide membrane 23B, and a porous support may be provided instead of the ceramic membrane 23A.

Examples of the porous ceramic membrane 23A include porous membranes containing stabilized zirconia, partially stabilized zirconia, and the like. Specific examples of the stabilized zirconia include yttria stabilized zirconia (YSZ) and scandia stabilized zirconia (ScSZ). Specific examples of the partially stabilized zirconia include yttria partially stabilized zirconia (YSZ) and scandia partially stabilized zirconia (ScSZ). The stabilized zirconia, partially stabilized zirconia, or the like may be doped with nickel, cobalt, ruthenium, or the like, and may be, for example, Ni—YSZ or the like.

The barium zirconium oxide membrane 23B is a membrane containing barium zirconium oxide, and may be a dense membrane containing barium zirconium oxide. In the barium zirconium oxide membrane 23B, generation and accumulation of carbonate due to reaction between carbon dioxide and a membrane component are suppressed as compared with a ceramic membrane containing LSCF (compound composed of La, Sr, Co. Fe and oxygen), BSCF (compound composed of Ba, Sr, Co. Fe and oxygen), and the like, and therefore, the barium zirconium oxide membrane 23B tends to exhibit excellent carbon dioxide resistance. In addition, since the hydrogen permeable membrane 23 includes the barium zirconium oxide membrane 23B, an inside of the hydrogen permeable membrane 23 has a characteristic of being in an internal short-circuit state, and therefore, while the hydrogen permeable membrane 23 has high hydrogen permeability, a decrease in hydrogen permeability in the hydrogen permeable membrane 23 can be suppressed. As a result, a gas having a high carbon dioxide concentration can be obtained on the hydrogen separation space 22A side.

The barium zirconium oxide membrane 23B is preferably a membrane obtained by doping barium zirconium oxide with at least one metal oxide containing at least one metal selected from the group consisting of yttrium (Y), ytterbium (Yb), selenium (Ce), strontium (Sr), scandium (Sc), gadolinium (Gd), and indium (In), and more preferably a membrane obtained by doping barium zirconium oxide with a metal oxide containing one or both of yttrium and ytterbium, from the viewpoint of achieving high durability and high hydrogen transport characteristics.

The barium zirconium oxide membrane 23B is preferably a membrane obtained by doping barium zirconium oxide with at least one metal oxide selected from the group consisting of yttrium oxide ($Y_2O_3$), ytterbium oxide ($Yb_2O_3$), selenium oxide ($SeO_2$), strontium oxide (SrO), scandium oxide ($Sc_2O_3$), gadolinium oxide ($Gd_2O_3$), and indium oxide ($In_2O_3$), and more preferably a membrane obtained by doping barium zirconium oxide with a metal oxide containing one or both of yttrium oxide and ytterbium oxide, from the viewpoint of achieving high durability and high hydrogen transport characteristics.

A molar ratio (barium zirconium oxide/metal constituting metal oxide) of barium zirconium oxide to the metal oxide in the barium zirconium oxide membrane 23B is preferably from 70/30 to 90/10, and more preferably from 75/25 to 85/15. When the molar ratio is 70/30 or more, high chemical stability can be achieved, and when the molar ratio is 90/10 or less, high hydrogen transport characteristics can be achieved.

From the viewpoint of enhancing the hydrogen permeability by imparting electron conductivity to the barium zirconium oxide membrane 23B and allowing hydrogen supplied to the hydrogen separation space 22A side to permeate as hydrogen ions ($H^+$) to the oxidation reactor 24 side, it is preferable that the surfaces of the barium zirconium oxide membrane 23B on the hydrogen separation space 22A side and the air flow path 24A side are electrically short-circuited. The phrase "the surfaces on the hydrogen separation space 22A side and the air flow path 24A side are electrically short-circuited" means that a short circuit not derived from barium zirconium oxide occurs, and for example, means that a microvia structure, an externally short-circuited structure, and other structures, which will be described later, are included. Since the barium zirconium oxide membrane has high electron conductivity, there may be no configuration in which the short circuit not derived from barium zirconium oxide occurs.

For example, when the barium zirconium oxide membrane 23B has a microvia structure penetrating the surfaces on the hydrogen separation space 22A side and the air flow path 24A side, and a material having electron conductivity is embedded in the microvia structure, the surfaces on the hydrogen separation space 22A side and the air flow path 24A side may be internally short-circuited. The microvia structure may be, for example, a micro cylindrical hole structure.

Examples of the material embedded in the microvia structure include a metal oxide, a metal-doped metal oxide, a metal, and a combination thereof. More specific examples include metal oxides such as $SrFeO_{3-\delta}$, metal-doped metal oxides such as $LaCrO_{3-\delta}$ doped with Sr, Ca, Mg, and the like, $LaFeO_{3-\delta}$ doped with Sr, Co, and the like, and $BaFeO_{3-\delta}$ doped with Sr, Co, and the like, metals such as Pd, Pd—Ag alloys, Ni, and Co, and combinations of two or more thereof.

When two or more of these materials are combined, different materials may be embedded in the hydrogen separation space 22A side and the air flow path 24A side in the microvia structure. For example, a metal may be embedded in the hydrogen separation space 22A side, or a metal oxide, a metal-doped metal oxide, or the like may be embedded in the air flow path 24A side.

Figure 5:
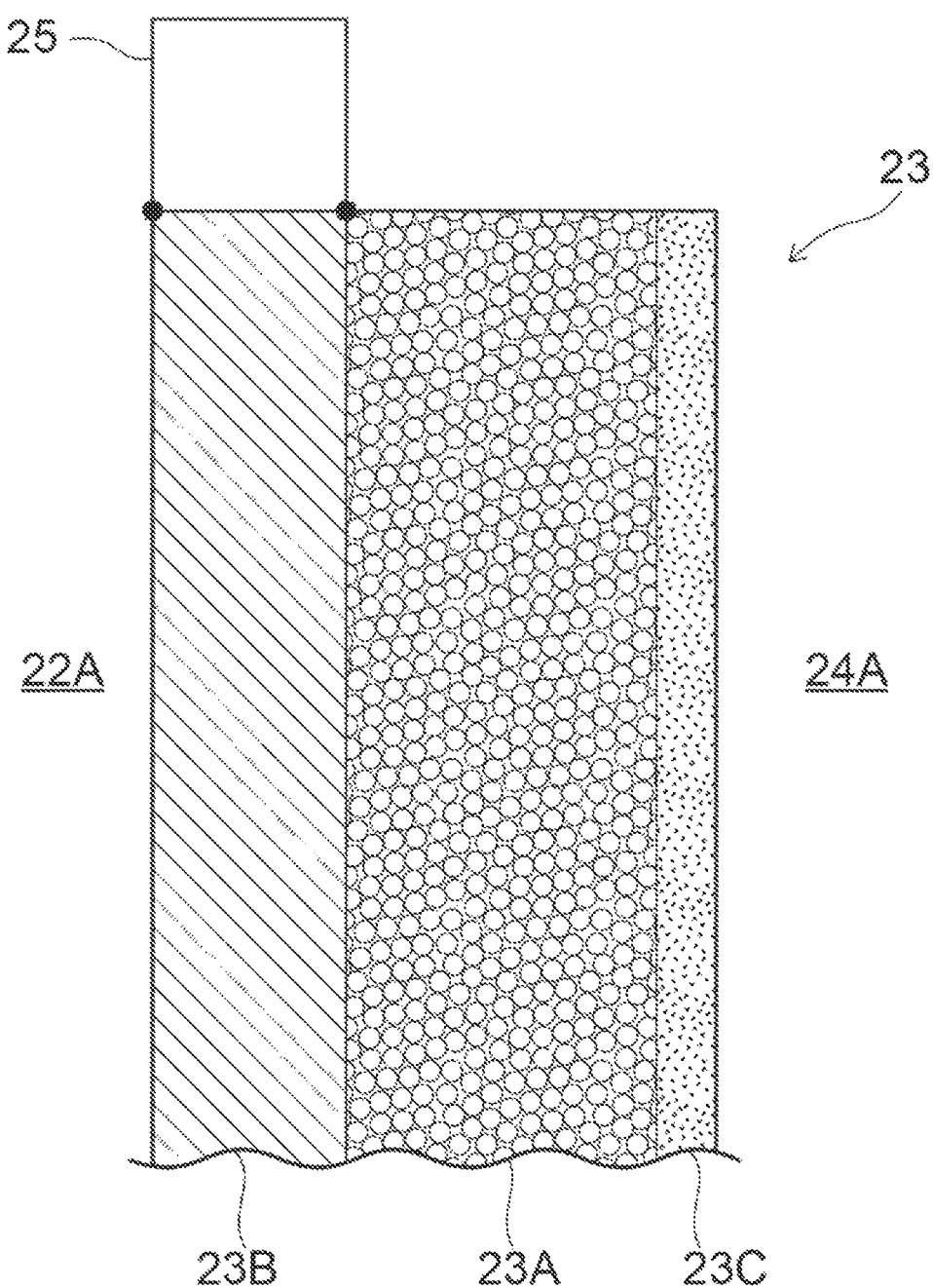
FIG. 5 is an enlarged cross-sectional view showing the hydrogen permeable membrane externally short-circuited.

Alternatively, as illustrated in FIG. 5, the barium zirconium oxide membrane 23B may include a current collector (not illustrated) on the surfaces on the hydrogen separation space 22A side and the air flow path 24A side, and the surface on the air flow path 24A side and the surface on the hydrogen separation space 22A side may be externally short-circuited by a conductive wire 25 or the like.

The reaction catalyst membrane 23C is not particularly limited as long as it is a catalyst that promotes an oxidation reaction between hydrogen and oxygen, and may be, for example, a porous body formed in a film shape made of a material such as nickel or ruthenium. Instead of disposing the reaction catalyst membrane 23C, the catalyst of the above-described oxidation reaction may be disposed or filled in at least a portion of the air flow path 24A.

A thickness of the hydrogen permeable membrane 23 is not particularly limited, and is preferably in a range of from 10 μm to 3000 μm, more preferably in a range of from 10 μm to 500 μm, and still more preferably in a range of from 15 μm to 150 μm, from the viewpoint of hydrogen permeability and mechanical strength.

A thickness of the barium zirconium oxide membrane 23B is preferably in a range of from 100 nm to 100 μm, and more preferably in a range of from 100 nm to 50 μm, from the viewpoint of suitably securing hydrogen permeability.

A thickness of the ceramic membrane 23A (preferably larger than the thickness of the barium zirconium oxide membrane 23B) is preferably in a range of from 10 μm to 500 μm, and more preferably in a range of from 30 μm to 300 μm.

As illustrated in FIGS. 1 and 2, the other end of the second fuel electrode off-gas pipe P7-2 is connected to an inlet of the hydrogen separation space 22A, and the downstream end of the branch air electrode off-gas pipe P6-2 is connected to an inlet of the air flow path 24A.

The second fuel electrode off-gas is supplied to the hydrogen separation space 22A, and hydrogen contained in the second fuel electrode off-gas permeates through the hydrogen permeable membrane 23 and moves to the air flow path 24A.

The second air electrode off-gas is supplied to the air flow path 24A, and is mixed with hydrogen that has permeated through the hydrogen permeable membrane 23 and moved. As a result, an oxidation reaction occurs between the hydrogen that has permeated and moved and oxygen, and water vapor is generated. The second air electrode off-gas containing water vapor, unreacted components, and the like is discharged to the outside from an exhaust pipe P12 connected to an outlet side of the air flow path 24A.

The second fuel electrode off-gas becomes a hydrogen separation gas having an increased carbon dioxide concentration as hydrogen is separated in the hydrogen separation space 22A. A hydrogen separation gas pipe P8-1 is connected to an outlet side of the hydrogen separation space 22A, and the hydrogen separation gas is sent from the hydrogen separation space 22A.

When carbon monoxide is also contained in the second fuel electrode off-gas, hydrogen is selectively separated to change chemical equilibrium, and water vapor and carbon monoxide in the second fuel electrode off-gas cause a shift reaction to be changed into carbon dioxide and hydrogen. Thus, by separating hydrogen in the second fuel electrode off-gas to the air flow path 24A side, a gas having a higher carbon dioxide concentration can be efficiently obtained.

As illustrated in FIG. 1, the hydrogen separation gas pipe P8-1 is connected to an inner flow path 55B of the reformer 54 described later.

(Reformer)

The reformer 54 of the present embodiment has a multiple cylindrical shape, and includes an annular vaporization flow path 55A disposed on a radially outer side and the inner flow path 55B disposed adjacent to a radially inner side of the vaporization flow path 55A. The vaporization flow path 55A and the inner flow path 55B are separated by a partition wall 57.

In the vaporization flow path 55A, an upper annular space is filled with a reforming catalyst 58, and a lower side is a spiral flow path 55A-2 formed in a spiral shape in the cylinder axis direction of a cylindrical shape.

One end of the fuel gas pipe P1-1 and one end of a water supply pipe P2-2 are connected to a lower end (flow path upstream side) of the vaporization flow path 55A.

A fuel supply blower B1 is connected to the other end of the fuel gas pipe P1-1, and methane as a fuel gas source is supplied to the vaporization flow path 55A of the reformer 54 by the fuel supply blower B1.

The other end of the water supply pipe P2-2 is connected to the water tank 27. The water supply pipe P2-2 is provided with an ion exchange resin 56 and a pump 27B. By driving the pump 27B, water stored in the water tank 27 is supplied to the reformer 54 through the ion exchange resin 56.

One end of the reformed gas pipe P1-2 is connected to an upper end (flow path downstream side) of the vaporization flow path 55A. The other end of the reformed gas pipe P1-2 is connected to the water vapor pipe P2.

One end of the hydrogen separation gas pipe P8-1 is connected to an upper end (flow path upstream side) of the inner flow path 55B, and the other end of the hydrogen separation gas pipe P8-1 is connected to the hydrogen separation space 22A of the oxidation reactor 20 with a hydrogen permeable membrane. The high-temperature hydrogen separation gas sent from the hydrogen separation space 22A is supplied to the inner flow path 55B via the hydrogen separation gas pipe P8-1.

One end of a hydrogen separation gas pipe P8-2 is connected to a lower end (flow path downstream side) of the inner flow path 55B, and the other end of the hydrogen separation gas pipe P8-2 is connected to a condenser 26 described later. The hydrogen separation gas discharged from the inner flow path 55B is sent to the condenser 26 described later via the hydrogen separation gas pipe P8-2.

Since the high-temperature hydrogen separation gas passes through the inner flow path 55B, the partition wall 57 separating the vaporization flow path 55A and the inner flow path 55B is heated by the hydrogen separation gas. Thus, in the vaporization flow path 55A adjacent to the inner flow path 55B, the reforming catalyst 58, the fuel gas, and water are heated by heat of the hydrogen separation gas, the fuel gas is steam reformed, the steam reformed fuel gas is sent to the first fuel electrode 12A of the first fuel cell stack 12 via the reformed gas pipe P1-2 and the water vapor pipe P2, the temperature of the high-temperature hydrogen separation gas is lowered, and a portion of water vapor contained in the hydrogen separation gas can be condensed and separated.

(Condenser)

The condenser 26 is provided with a cooling water circulation flow path 26A, cooling water from the discharge heat input type absorption refrigeration device 36 described later is circulated and supplied by driving of a pump 26P, and the hydrogen separation gas sent from the reformer 54 is further cooled. As a result, water vapor in the hydrogen separation gas is condensed, and most of water vapor contained in the hydrogen separation gas is separated and removed. The condensed water is sent to the water tank 27 via a water pipe P9.

The hydrogen separation gas from which water (liquid phase) has been removed by the condenser 26 is a gas having a high carbon dioxide concentration, and this gas is referred to as a carbon dioxide-rich gas. The carbon dioxide-rich gas is sent to a carbon dioxide gas pipe P10. The carbon dioxide gas pipe P10 is provided with a composition detector 44. The composition detector 44 detects a composition of the carbon dioxide-rich gas sent from the condenser 26. Specifically, the concentration of fuel gas such as methane, carbon monoxide, and hydrogen, and the concentration of any one or more of carbon dioxide and oxygen are detected. The composition detector 44 is connected to the controller, and composition information of the detected carbon dioxide-rich gas is transmitted to the controller. The controller preferably performs various types of control so as to maximize the concentration of carbon dioxide gas in the carbon dioxide-rich gas and minimize components other than carbon dioxide.

The carbon dioxide gas liquefier 66 described later is provided on a downstream side of the carbon dioxide gas pipe P10.

The second heat exchanger 32 is provided on the downstream side of the junction where the air electrode off-gas pipes P6 from the first air electrode 12B and the second air electrode 14B merge together. In the second heat exchanger 32, heat exchange is performed between the air electrode off-gas flowing through the air electrode off-gas pipe P6 and the oxidant gas flowing through the oxidant gas pipe P5, the oxidant gas is heated, and the air electrode off-gas is cooled. The air electrode off-gas is supplied to the discharge heat input type absorption refrigeration device 36 via the second heat exchanger 32.

(Discharge Heat Input Type Absorption Refrigeration Device)

The discharge heat input type absorption refrigeration device 36 is a heat pump that generates cold heat using discharge heat, and as an example, a steam/discharge heat input type absorption refrigeration device can be used. In the steam/discharge heat input type absorption refrigeration device, an absorbent (for example, a lithium bromide aqueous solution, an ammonia aqueous solution, or the like) having absorbed water vapor is heated by heat of the air electrode off-gas to separate water from the absorbent and regenerate the absorbent. The water vapor is condensed in the air electrode off-gas cooled by heating the absorbent, and the condensed water is supplied to the water tank 27 by a water pipe P36-2. The air electrode off-gas after the water vapor is condensed and removed is sent to an exhaust pipe P36-1 and discharged to the outside of the discharge heat input type absorption refrigeration device 36.

The discharge heat input type absorption refrigeration device 36 includes a pump for circulating the absorbent and a pump for circulating the water separated from the absorbent (both not illustrated). These pumps are driven by a DC motor, and the DC motor can be driven by DC power generated by the first fuel cell stack 12 and the second fuel cell stack 14. Although these pumps may be driven by an AC motor, the pumps are preferably driven by the DC motor from the viewpoint of less energy loss and efficiency.

The absorbent regenerated by heating promotes evaporation of water by absorbing water vapor and contributes to generation of cold heat. The discharge heat input type absorption refrigeration device 36 is connected to a cooling tower 38 via a heat dissipation circuit 37. A pump 37P is installed in the heat dissipation circuit 37, and cooling water is supplied to the heat dissipation circuit 37 by the pump 37P. Absorbed heat generated when the absorbent absorbs water vapor in the discharge heat input type absorption refrigeration device 36 is released from the cooling tower 38 to the atmosphere via the cooling water flowing through the heat dissipation circuit 37.

The cold heat generated by the discharge heat input type absorption refrigeration device 36 is sent to the condenser 26 via the cooling water flowing through the cooling water circulation flow path 26A, the hydrogen separation gas is cooled by the condenser 26, and water vapor in the hydrogen separation gas is condensed and removed.

The water tank 27 is connected to the cooling water circulation flow path 26A, the heat dissipation circuit 37, and a heat medium flow path (not illustrated) through which water as a heat medium of the discharge heat input type absorption refrigeration device 36 flows. In the cooling water circulation flow path 26A, the heat dissipation circuit 37, and the heat medium flow path, when water is insufficient, water is replenished, if appropriate, from the water tank 27 via a replenishment system 67 described below.

As an example, the discharge heat input type absorption refrigeration device 36 has an ability to generate cooling water at from −5° C. to 12° C.

(Replenishment System)

The replenishment system 67 including a pipe P11, a pump 27A, and the like is connected to the water tank 27. One end of the pipe P11 is connected to the water tank 27, and the other end of the pipe P11 is branched into three pipes and connected to the cooling tower 38, the cooling water circulation flow path 26A, and a liquefaction cooling water circulation path 70A described later. The pump 27A is provided in the pipe P11 before branching, and an electromagnetic valve (not illustrated) is attached to each of the three branched pipes. The pump 27A and the electromagnetic valve are controlled by a controller described later.

The cooling tower 38, the cooling water circulation flow path 26A, and the liquefaction cooling water circulation path 70A each include a buffer tank (not illustrated) that stores cooling water, and the buffer tank is provided with a liquid level sensor (not illustrated) that detects a storage amount of cooling water. The liquid level sensor is connected to the controller described later, and detection data of a liquid level (storage amount of cooling water) is output to the controller. As a result, the controller can grasp the storage amount of cooling water in each of the cooling tower 38, the cooling water circulation flow path 26A, and the liquefaction cooling water circulation path 70A.

(Carbon Dioxide Gas Liquefier)

The carbon dioxide-rich gas sent to the carbon dioxide gas pipe P10 is sent to the carbon dioxide gas liquefier 66 including a compressor 68, a cooling device (liquefaction device) 70, and the like.

The carbon dioxide-rich gas sent to the carbon dioxide gas liquefier 66 is first compressed by the compressor 68. The compressor 68 is driven by a DC motor (not illustrated), and can compress the carbon dioxide gas to 4 MPa or more. The DC motor of the compressor 68 is driven by the electric power obtained by the first fuel cell stack 12 and the second fuel cell stack 14, and for example, at the time of starting the system, the DC motor can be driven by using an external commercial power supply, or can be driven by electric power (surplus electric power) obtained by renewable energy power generation (not illustrated). Examples of the renewable energy power generation include solar power generation, solar heat power generation, hydraulic power generation, wind power generation, geothermal power generation, wave power generation, temperature difference power generation, and biomass power generation, and other power generation may be used. The form of the compressor 68 to be driven by a DC motor is not limited, and the compressor 68 may be driven by an AC motor.

Since the DC motor of the compressor 68 can be directly driven by using the DC power obtained by the first fuel cell stack 12 and the second fuel cell stack 14, energy loss is small and efficiency is high, for example as compared with the case where the DC power obtained by the first fuel cell stack 12 and the second fuel cell stack 14 is converted into the AC power and the AC motor is driven by the AC power. The DC motor of the compressor 68 is controlled by the controller.

The carbon dioxide gas compressed by the compressor 68 is sent to a cooling device 70 via a pipe P14. The pipe P14 is provided with a temperature sensor 74 and a pressure sensor 76, and temperature data of the carbon dioxide gas measured by the temperature sensor 74 and pressure data of the carbon dioxide gas measured by the pressure sensor 76 are sent to the controller.

The cooling device 70 is provided with the liquefaction cooling water circulation path 70A, and a circulation pump 78 controlled by the controller is attached to the liquefaction cooling water circulation path 70A. In the liquefaction cooling water circulation path 70A, the cooling water from the discharge heat input type absorption refrigeration device 36 is circulated and supplied, and the liquefaction cooling water circulation path 70A cools the compressed carbon dioxide-rich gas supplied from the compressor 68 to generate liquefied carbon dioxide.

The liquefaction cooling water circulation path 70A is provided with a temperature sensor 80 that detects a temperature of the cooling water flowing into the cooling device 70. Temperature data of the cooling water measured by the temperature sensor 80 is sent to the controller. A flow rate sensor (not illustrated) that measures the flow rate of the cooling water may be provided in the liquefaction cooling water circulation path 70A.

The liquefied carbon dioxide generated by the cooling device 70 is sent to and stored in the tank 84 via a pipe P15 and a pump 82.

The fuel cell power generation system 10A is provided with a controller (not illustrated) that controls the entire fuel cell power generation system. The controller includes a CPU, a ROM, a RAM, a memory, and the like. The memory stores data, procedures, and the like necessary for flow rate adjustment processing, cooling water temperature adjustment processing, and processing during normal operation, which will be described later. The controller is connected to the flow rate adjusting valve 42, the composition detector 44, the discharge heat input type absorption refrigeration device 36, and the like. The flow rate adjusting valve 42, the composition detector 44, the discharge heat input type absorption refrigeration device 36, and the like are controlled by the controller. The controller is also connected to other devices other than the above devices.

In fuel cell power generation system 10A, a pump, a blower, and other auxiliary machines are driven by electric power generated by the fuel cell power generation system 10A. In order to efficiently use the electric power generated by the fuel cell power generation system 10A without converting the electric power into AC while maintaining DC, the auxiliary machine is preferably driven by DC current.

Operation and Advantageous Effects

Next, an operation of the fuel cell power generation system 10A of the present embodiment will be described.

In the fuel cell power generation system 10A, the fuel gas (methane) is sent from the fuel gas source to the reformer 54 via the fuel gas pipe P1-1 by the fuel supply blower B1, and the fuel gas is reformed by the reformer 54.

The reformed fuel gas is supplied to the first fuel electrode 12A of the first fuel cell stack 12 via the fuel gas pipe P1-2.

From the water vapor pipe P2, water vapor for water vapor reforming is supplied to the first fuel electrode 12A via the fuel gas pipe P1-2.

In the first fuel electrode 12A of the first fuel cell stack 12, the fuel gas is steam reformed to generate hydrogen and carbon monoxide. Carbon dioxide and hydrogen are generated by the shift reaction between the generated carbon monoxide and water vapor.

Air is supplied to the first air electrode 12B of the first fuel cell stack 12 via the oxidant gas pipe P5. In the first fuel cell stack 12, hydrogen ions move in the first fuel electrode 12A and the first air electrode 12B, and the above-described reaction occurs, whereby power generation is performed. The first fuel electrode off-gas is sent from the first fuel electrode 12A of the first fuel cell stack 12 to the first fuel electrode off-gas pipe P7. The air electrode off-gas is sent from the first air electrode 12B to the air electrode off-gas pipe P6.

The first fuel electrode off-gas sent from the first fuel electrode 12A is guided to the first fuel electrode off-gas pipe P7 and supplied to the second fuel electrode 14A of the second fuel cell stack 14. Air is supplied to the second air electrode 14B of the second fuel cell stack 14 via the oxidant gas pipe P5.

The second fuel cell stack 14 also generates electric power similarly to the first fuel cell stack 12. The second fuel electrode off-gas is sent from the second fuel electrode 14A of the second fuel cell stack 14 to the second fuel electrode off-gas pipe P7-2. The air electrode off-gas is sent from the second air electrode 14B to the air electrode off-gas pipe P6.

The air electrode off-gas is supplied to the discharge heat input type absorption refrigeration device 36 via the second heat exchanger 32. In the second heat exchanger 32, heat exchange is performed between the air electrode off-gas and the oxidant gas, and the oxidant gas is heated by the air electrode off-gas. In the discharge heat input type absorption refrigeration device 36, as described above, cold heat is generated using the heat of the air electrode off-gas.

The second fuel electrode off-gas is supplied to the hydrogen separator 22 of the oxidation reactor 20 with a hydrogen permeable membrane, and flows through the hydrogen separation space 22A. Hydrogen contained in the second fuel electrode off-gas permeates through the hydrogen permeable membrane 23 and moves to the air flow path 24A.

The air electrode off-gas branched to the branch air electrode off-gas pipe P6-2 is supplied to the oxidation reactor 24 of the oxidation reactor 20 with a hydrogen permeable membrane. The air electrode off-gas supplied to the oxidation reactor 24 flows through the air flow path 24A. In the air flow path 24A, oxygen contained in the air electrode off-gas undergoes an oxidation reaction with hydrogen that has permeated through the hydrogen permeable membrane 23 and moved to the air flow path 24A side, and water vapor is generated.

In the oxidation reactor 20 with a hydrogen permeable membrane, since the hydrogen permeable membrane 23 contains the barium zirconium oxide membrane 23B, generation and accumulation of carbonate due to reaction between carbon dioxide and a membrane component are suppressed as compared with the case of using a ceramic membrane containing LSCF (compound composed of La. Sr, Co, Fe and oxygen). BSCF (compound composed of Ba, Sr, Co, Fe and oxygen), and the like, and therefore, there is a tendency to exhibit excellent carbon dioxide resistance. In addition, since the hydrogen permeable membrane includes the barium zirconium oxide membrane, an inside of the hydrogen permeable membrane has a characteristic of being in an internal short-circuit state, and therefore, while the hydrogen permeable membrane has high hydrogen permeability, a decrease in hydrogen permeability in the hydrogen permeable membrane can be suppressed.

In the oxidation reactor 24 of the oxidation reactor 20 with a hydrogen permeable membrane, the reaction catalyst membrane 23C promotes the oxidation reaction between hydrogen that has permeated through the hydrogen permeable membrane 23 and oxygen to generate water vapor. Since the air flow path 24A is formed in a spiral shape and has a long flow path length, it is possible to secure a long time for the oxidation reaction, and the oxidation reaction can be sufficiently and efficiently performed by moving a sufficient amount of hydrogen from the hydrogen separation space 22A to the air flow path 24A side. As a result, the hydrogen separation gas having an increased concentration of the carbon dioxide gas can be discharged from the hydrogen separator 22.

The hydrogen separation gas containing carbon dioxide and water vapor is sent from the hydrogen separation space 22A to the hydrogen separation gas pipe P8-1. The hydrogen separation gas sent to the hydrogen separation gas pipe P8-1 is supplied to the condenser 26 via the inner flow path 55B of the reformer 54.

In the reformer 54, in the vaporization flow path 55A, the mixed gas of the fuel gas and water vapor and the reforming catalyst 58 are heated by heat exchange with the hydrogen separation gas, and hydrogen and carbon monoxide are generated by water vapor reforming reaction. Carbon dioxide and hydrogen are generated by the shift reaction between the generated carbon monoxide and water vapor. The reformed gas containing unreacted fuel gas (methane), hydrogen, carbon monoxide, carbon dioxide, and the like is supplied to the first fuel electrode 12A through the reformed gas pipe P1-2.

Since the lower side of the vaporization flow path 55A is the long spiral flow path 55A-2 formed in a spiral shape in the cylindrical axis direction of the cylindrical shape, the water supplied together with the fuel gas is sufficiently heated while passing through the long spiral flow path 55A-2 over time to become water vapor. Since the heated fuel gas and water vapor flow through the spiral flow path 55A-2 and then pass through the reforming catalyst 58 heated by the heat of the hydrogen separation gas, the reforming reaction efficiently and reliably occurs. On the other hand, the temperature of the high-temperature hydrogen separation gas decreases in a process in which heat is effectively utilized, and the temperature of the hydrogen separation gas is lowered so that a portion of water vapor contained in the hydrogen separation gas can be condensed and recovered, or most of water vapor contained in the hydrogen separation gas can be easily condensed and separated by slight cold heat supply.

The hydrogen separation gas supplied to the condenser 26 is cooled by the cooling water from the discharge heat input type absorption refrigeration device 36 circulated and supplied via the cooling water circulation flow path 26A, and water vapor in the hydrogen separation gas is condensed. The condensed water is sent to the water tank 27 via the water pipe P9 and stored in the water tank 27.

The hydrogen separation gas from which water vapor has been removed by the condenser 26 becomes a carbon dioxide-rich gas having a high carbon dioxide concentration, and is sent to the composition detector 44 via the carbon dioxide gas pipe P10. In the composition detector 44, the composition of the carbon dioxide-rich gas is detected, and the detected information is transmitted to the controller.

Based on the composition information transmitted from the composition detector 44, the controller controls the flow rate adjusting valve 42 to adjust an amount of the air electrode off-gas branched into the branch air electrode off-gas pipe P6-2, and controls the temperature of the cooling water sent to the cooling water circulation flow path 26A and the like by the discharge heat input type absorption refrigeration device 36.

In the flow rate adjustment processing, it is determined whether the concentration of the fuel gas is within a threshold value G1 in the composition information of the carbon dioxide-rich gas detected by the composition detector 44. Here, the threshold value G1 may be a sufficiently low concentration in the carbon dioxide-rich gas, and is, for example, preferably in a range of from 0.1 vol % to 5 vol %, and more preferably in a range of from 0.1 vol % to 1 vol %. When the concentration of the fuel gas is higher than the threshold value G1, the flow rate adjusting valve 42 is controlled to increase the flow rate of the air electrode off-gas branched into the branch air electrode off-gas pipe P6-2. As a result, an amount of hydrogen that permeates through the hydrogen permeable membrane 23 and moves to the air flow path 24A increases, and unreacted fuel gas contained in the carbon dioxide-rich gas can be reduced by causing oxidation reaction in the air flow path 24A.

The carbon dioxide-rich gas sent to the carbon dioxide gas pipe P10 is sent to the compressor 68 of the carbon dioxide gas liquefier 66 and compressed, and the compressed carbon dioxide-rich gas is sent to the cooling device 70. The cooling device 70 cools the carbon dioxide-rich gas compressed by the cooling water from the discharge heat input type absorption refrigeration device 36 to generate liquefied carbon dioxide.

Since the discharge heat input type absorption refrigeration device 36 generates cold heat using the discharge heat of the air electrode off-gas, it is possible to efficiently generate cold heat (used to cool water to obtain cooling water) with less power as compared with a case where cold heat is generated by a refrigeration device (for example, a turbo refrigeration device or the like) of a type in which a compressor is driven by a motor to compress and expand a refrigerant.

Figure 4:
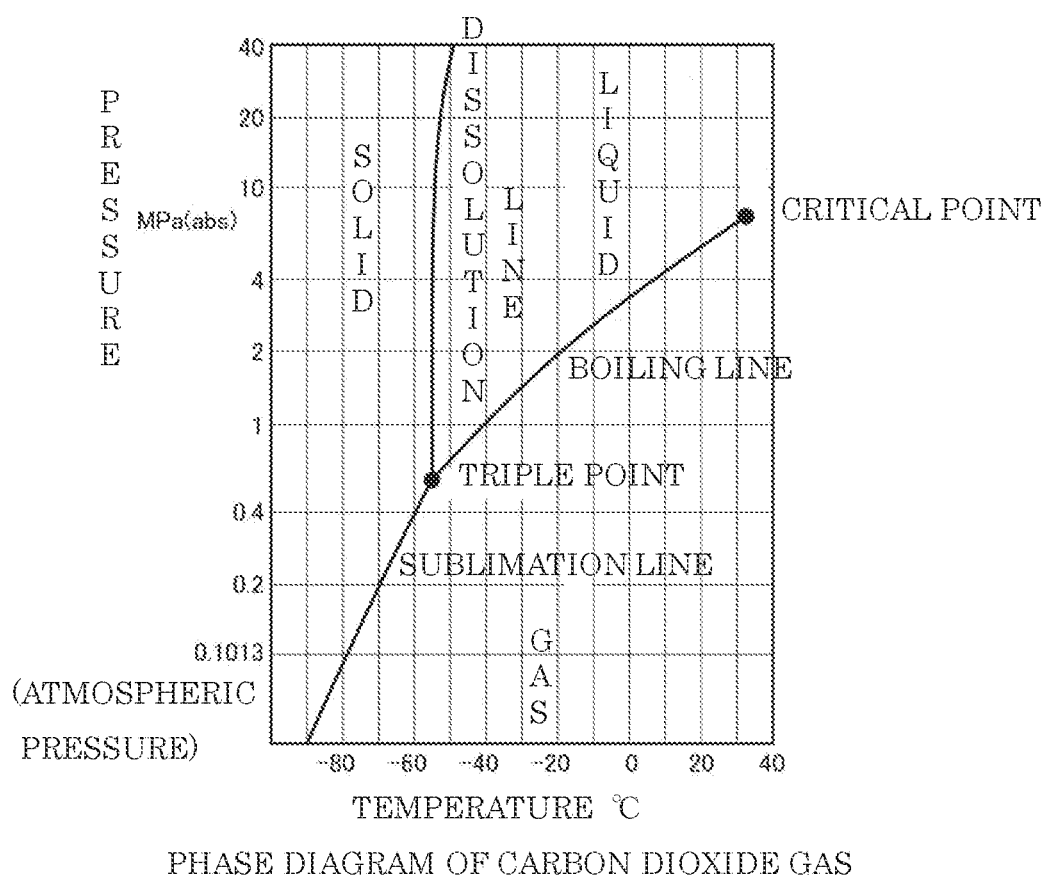
FIG. 4 is a phase diagram of carbon dioxide.

From the phase diagram of the carbon dioxide gas illustrated in FIG. 4, as an example, the carbon dioxide gas compressed to 4 MPa or more is liquefied when cooled to a temperature lower than a critical temperature (31.1° C.) of the carbon dioxide gas.

In the carbon dioxide gas liquefier 66 of the present embodiment, as an example, the carbon dioxide gas is compressed to 4 MPa by the compressor 68, and then the compressed carbon dioxide gas is cooled with cooling water at from −5° C. to 12° C. in the cooling device 70 to obtain liquefied carbon dioxide. The pressure of the carbon dioxide gas and the cooling temperature are not limited to the above values, and can be changed, if appropriate.

(Control of Liquefaction)

According to any one or more of measurement results including the temperature (measured by the temperature sensor 74) of high pressure carbon dioxide gas having passed through the compressor 68 and the pressure (measured by the pressure sensor 76) or an amount of carbon dioxide gas remaining without being liquefied, the controller controls the operation of the discharge heat input type absorption refrigeration device 36 and the operation of the circulation pump 78, such as the temperature (measured by the temperature sensor 80) and flow rate (measured by a flow rate sensor (not illustrated)) of the cooling water supplied to the cooling device 70, and efficiently converts the carbon dioxide gas into liquefied carbon dioxide.

That is, in the present embodiment, the controller calculates a cold heat amount for maximizing a liquefaction amount of carbon dioxide gas according to the temperature and pressure of the recovered carbon dioxide gas or an amount of the residual carbon dioxide gas at the time of liquefaction, and the temperature of the cooling water corresponding thereto can be lowered, the flow rate of the circulating cooling water can be increased, or both of them can be used in combination.

In the inside of the cooling device 70, the liquefied carbon dioxide accumulates below, and the carbon dioxide gas that is not liquefied remains above the liquefied carbon dioxide. Therefore, by measuring the liquid level of the liquefied carbon dioxide accumulated in the inside of the cooling device 70, the amount of the carbon dioxide gas remaining without being liquefied in the inside of the cooling device 70 can be indirectly measured (the internal space volume of the cooling device 70 is known).

The liquefied carbon dioxide generated in the carbon dioxide gas liquefier 66 in this manner is sent to and stored in the tank 84 via the pipe P15 and the pump 82. The liquefied carbon dioxide stored in the tank 84 can also be used for commercial and industrial use as in the related art.

In the fuel cell power generation system 10A of the present embodiment, the first fuel cell stack 12 and from the second fuel cell stack 14 to the tank 84 are continuously connected and provided on-site, so that the liquefied carbon dioxide can be continuously efficiently produced and stored in the tank 84 during power generation. The liquefied carbon dioxide stored in the tank 84 may be transported by a lorry 86 or the like, or may be transported by a pipeline or the like.

In the oxidation reactor 24, water vapor is generated by the oxidation reaction between hydrogen that has permeated through the hydrogen permeable membrane 23 and oxygen. Therefore, hydrogen can be reduced from the second fuel electrode off-gas to recover high concentration carbon dioxide.

Since the fuel cell power generation system 10A of the present embodiment includes the branch air electrode off-gas pipe P6-2 branched from the air electrode off-gas pipe P6, the air electrode off-gas flow rate to be branched into the branch air electrode off-gas pipe P6-2 can be easily adjusted based on the composition information of the carbon dioxide-rich gas detected by the composition detector 44. As a result, the flow rate adjusting valve 42 may be controlled so that an amount of unreacted fuel gas contained in the hydrogen separation gas is lower than a predetermined threshold value to adjust the flow rate of the air electrode off-gas branched into the branch air electrode off-gas pipe P6-2.

In the fuel cell power generation system 10A of the present embodiment, an amount of water to be condensed by the condenser 26 is adjusted based on the composition information of the carbon dioxide-rich gas detected by the composition detector 44, whereby the carbon dioxide concentration of the carbon dioxide-rich gas can be increased.

In fuel cell power generation system 10A of the present embodiment, since a hydrogen ion conduction type solid oxide fuel cell is used for the fuel cell stack, water vapor is not generated in the first fuel electrode 12A. Therefore, since an amount of water vapor contained in the first fuel electrode off-gas is reduced, power generation efficiency in the second fuel cell can be improved. Since the amount of water vapor contained in the second fuel electrode off-gas is also reduced, the amount of water vapor removed from the second fuel electrode off-gas can be reduced.

In the fuel cell power generation system 10A of the present embodiment, the oxidation reactor 24 is disposed adjacent to the hydrogen permeable membrane 23 of the hydrogen separator 22, so that the compact oxidation reactor 20 with a hydrogen permeable membrane in which the oxidation reactor 24 and the hydrogen separator 22 are integrally formed can be configured.

In fuel cell power generation system 10A of the present embodiment, since the heat of the air electrode off-gas is used for cold heat generation in the discharge heat input type absorption refrigeration device 36, discharge heat from the first fuel cell stack 12 and the second fuel cell stack 14 can be effectively used. Since the air electrode off-gas contains a large amount of water vapor, the water vapor is condensed at the time of heat exchange in the discharge heat input type absorption refrigeration device 36, so that condensation heat can also be effectively used.

In the fuel cell power generation system 10A of the present embodiment, the controller grasps the storage amount of the cooling water in each buffer tank of the cooling tower 38, the cooling water circulation flow path 26A, and the liquefaction cooling water circulation path 70A based on the detection data from the liquid level sensor, and when it is determined that the storage amount of the cooling water is less than a preset lower limit value, the controller can control the electromagnetic valve and the pump 27A to replenish the water used for the cooling water from the water tank 27. As described above, when the cooling water is insufficient, it is not necessary to supply water from an external public water supply system or the like, and an external dependence amount of water can be reduced.

In the present embodiment, carbon dioxide is separated from the hydrogen separation gas by condensing and removing water vapor in the hydrogen separation gas by the condenser 26. However, carbon dioxide may be separated by other means, for example, a carbon dioxide separation membrane, or carbon dioxide may be separated by a so-called PSA (Pressure Swing Adsorption) apparatus that separates/produces gas by changing pressure using an adsorbent.

In the oxidation reactor 20 with a hydrogen permeable membrane of the present embodiment, the outside is the hydrogen separator 22, and the inside is the oxidation reactor 24; however, the outside may be the oxidation reactor 24, and the inside may be the hydrogen separator 22. When the outside is the oxidation reactor 24 and the inside is the hydrogen separator 22, the reaction catalyst membrane 23C, the ceramic membrane 23A, and the barium zirconium oxide membrane 23B are stacked in this order from the oxidation reactor 24 as the outside to the hydrogen separator 22 as the inside.

Second Embodiment

Next, a second embodiment of the present invention will be described. In the present embodiment, the same components as those of the first embodiment are denoted by the same reference numerals, and detailed description thereof will be omitted.

Figure 6:
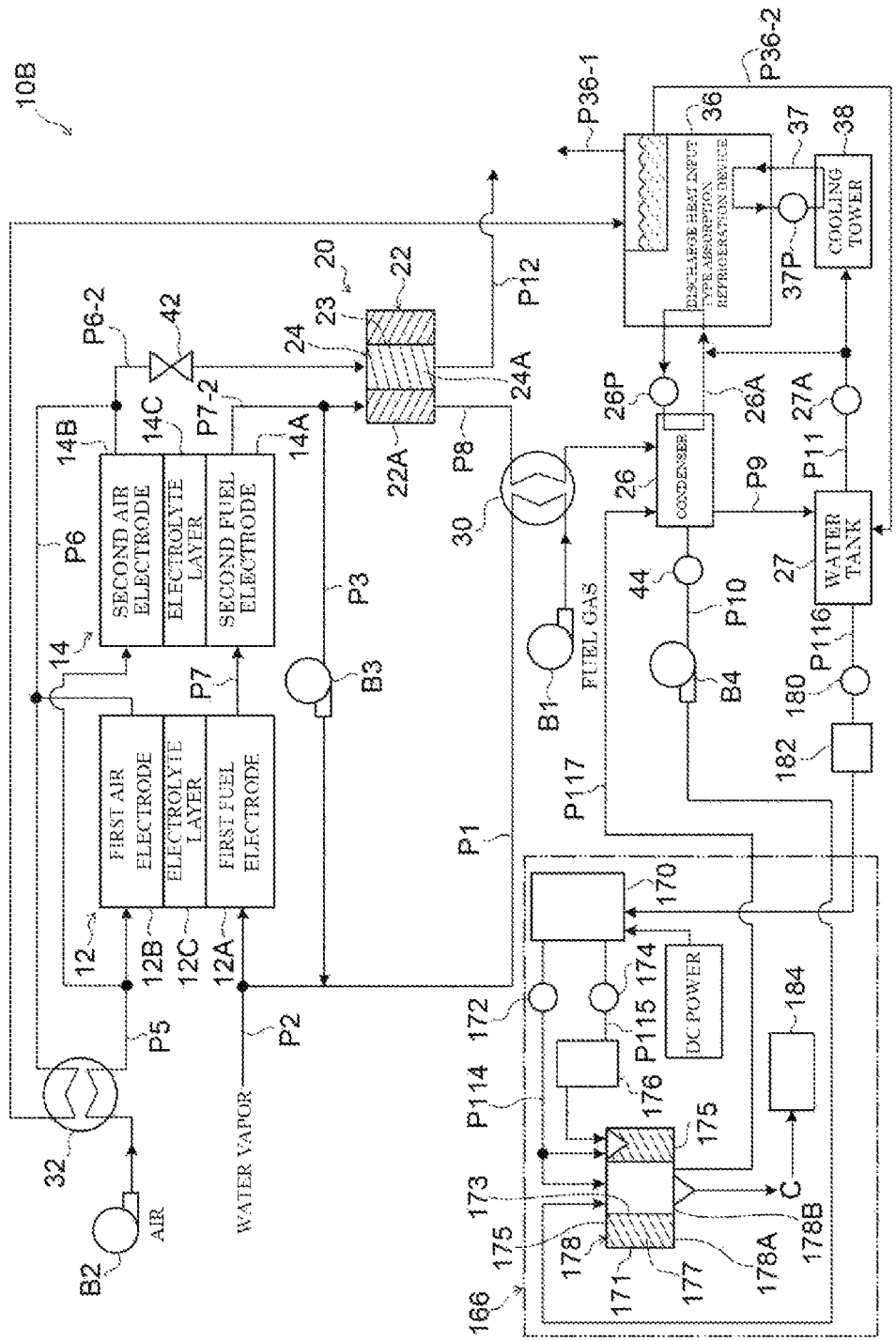
FIG. 6 is a schematic diagram of a fuel cell power generation system according to a second embodiment.

FIG. 6 illustrates a fuel cell power generation system 10B according to the second embodiment of the present invention. The fuel cell power generation system 10B is a system that produces carbon from carbon dioxide gas. On the downstream side of the carbon dioxide gas pipe P10, a carbon producer 166 is provided instead of the carbon dioxide gas liquefier 66 of the fuel cell power generation system 10B of the first embodiment.

In the present embodiment, one end of a fuel gas pipe P1 is connected to a first fuel electrode 12A of a first fuel cell stack 12, and the other end of the fuel gas pipe P1 is connected to a fuel gas source (not illustrated).

In the present embodiment, a circulation gas pipe P3 is branched from the second fuel electrode off-gas pipe P7-2, and the circulation gas pipe P3 is connected to the fuel gas pipe P1. The circulation gas pipe P3 is provided with a circulation gas blower B3.

A first heat exchanger 30 is provided in an intermediate portion of the fuel gas pipe P1. A hydrogen separation gas pipe P8 that sends the hydrogen separation gas is connected to an outlet side of a hydrogen separation space 22A of the oxidation reactor 20 with a hydrogen permeable membrane, and the hydrogen separation gas pipe P8 is connected to the condenser 26 at the other end via the first heat exchanger 30. In the first heat exchanger 30, while the fuel gas is heated by heat exchange between the fuel gas and the hydrogen separation gas, the high-temperature hydrogen separation gas is cooled, and the temperature is lowered so that a portion of water vapor contained in the hydrogen separation gas can be condensed and separated or most of water vapor can be condensed and separated by slight cold heat supply.

The hydrogen separation gas that has passed through the first heat exchanger 30 is sent to the condenser 26, and the hydrogen separation gas from which water vapor has been removed by the condenser 26 becomes a carbon dioxide-rich gas having a high carbon dioxide concentration, is sent to the carbon dioxide gas pipe P10 by a carbon dioxide blower B4, and is sent to the composition detector 44. In the composition detector 44, the composition of the carbon dioxide-rich gas is detected, and the detected information is transmitted to the controller.

Based on the composition information transmitted from the composition detector 44, the controller controls a flow rate adjusting valve 42 to adjust an amount of the air electrode off-gas branched into a branch air electrode off-gas pipe P6-2, and controls the temperature of the cooling water sent to a cooling water circulation flow path 26A and the like by a discharge heat input type absorption refrigeration device 36. Specifically, the controller executes the flow rate adjustment processing and the cooling water temperature adjustment processing.

The carbon dioxide gas sent to the carbon dioxide gas pipe P10 is sent to the carbon producer 166.

(Configuration of Carbon Producer)

The carbon producer 166 includes a water electrolyzer 170, a pipe P114, a hydrogen blower 172, a pipe P115, an oxygen blower 174, an oxygen tank 176, a powder carbon producer (carbon producer) 178, and the like.

Water in the water tank 27 that has passed through a pipe P116, a pump 180, and a water purification device 182 is supplied to the water electrolyzer 170. The water purification device 182 purifies (removal of foreign matters, pH adjustment, etc.) the water from the water tank 27. The water electrolyzer 170 can generate hydrogen gas and oxygen gas by electrolyzing the purified water using electric power obtained by the first fuel cell stack 12 and the second fuel cell stack 14. The water electrolyzer 170 can also electrolyze water using electric power (so-called "clean energy") obtained by renewable energy power generation (not illustrated). Examples of the renewable energy power generation include solar power generation, solar heat power generation, hydraulic power generation, wind power generation, geothermal power generation, wave power generation, temperature difference power generation, and biomass power generation, and other power generation may be used. That is, from the viewpoint of reducing carbon dioxide in the atmosphere or suppressing release of carbon dioxide into the atmosphere, it is preferable to use the DC power obtained in the first fuel cell stack 12 and the second fuel cell stack 14, electric power obtained by renewable energy power generation, and the like.

Since the water electrolyzer 170 electrolyzes water using the DC power obtained by the first fuel cell stack 12 and the second fuel cell stack 14, the electric power obtained by renewable energy power generation, and the like, it is possible to efficiently electrolyze the water, for example, as compared with a case where AC power of a power generator that releases carbon dioxide gas is converted into DC power and used for electrolysis. The water electrolyzer 170 is controlled by the controller.

The hydrogen gas generated by the water electrolyzer 170 is sent to the powder carbon producer 178 via the pipe P114 and the hydrogen blower 172, and the oxygen gas is sent to the oxygen tank 176 via the pipe P115 and the oxygen blower 174 and stored in the oxygen tank 176. The hydrogen blower 172 and the oxygen blower 174 are controlled by the controller.

(Configuration of Powder Carbon Producer)

The powder carbon producer 178 has a multiple cylindrical shape in which the inside is sealed, the multiple cylindrical shape including an outer cylinder 171, a cylindrical partition wall 173 disposed inside the outer cylinder 171, and a closing member 175 that closes an opening portion on a cylinder axial direction end side of the outer cylinder 171 and the cylindrical partition wall 173.

A space between the outer cylinder 171 and the partition wall 173 is a gas flow path 178A, an inner peripheral side of a cylindrical partition wall 173 is a carbon immobilization part 178B, and the gas flow path 178A and the carbon immobilization part 178B are isolated by the partition wall 173.

A spiral path forming member 177 having a spiral shape is disposed inside the gas flow path 178A, and the gas flow path 178A is formed in a spiral shape in the cylinder axis direction of the powder carbon producer 178.

In the carbon immobilization part 178B, carbon dioxide gas sent from the condenser 26 and hydrogen gas sent from the water electrolyzer 170 are supplied. In the carbon immobilization part 178B, a reduction reaction as expressed by the following formula (5) is caused using a reduction catalyst with respect to the carbon dioxide gas and the hydrogen gas.

$$CO_2 + 2H_2 \rightarrow C + 2H_2O \qquad (5)$$

C produced in the reduction reaction is powder carbon, and can be discharged from a lower portion of the carbon immobilization part 178B. $H_2O$ generated by the reduction reaction is specifically water vapor, and the water vapor is sent to the condenser 26 via a pipe P117.

The memory of the controller of the present embodiment stores data, procedures, and the like necessary for the flow rate adjustment processing, the cooling water temperature adjustment processing, and the processing during normal operation, which will be described later. The controller is connected to the flow rate adjusting valve 42, the composition detector 44, the discharge heat input type absorption refrigeration device 36, and the like. The flow rate adjusting valve 42, the composition detector 44, the discharge heat input type absorption refrigeration device 36, and the like are controlled by the controller.

In fuel cell power generation system 10B, a pump, a blower, and other auxiliary machines are driven by electric power generated by the fuel cell power generation system 10B. In order to efficiently use the electric power generated by the fuel cell power generation system 10B without converting the electric power into AC while maintaining DC, the auxiliary machine is preferably driven by DC current.

Operation and Advantageous Effects

Next, an operation of the fuel cell power generation system 10B of the present embodiment will be described.

The water electrolyzer 170 electrolyzes water sent from the water purification device 182 to produce hydrogen gas and oxygen gas. The carbon dioxide-rich gas sent to the carbon dioxide gas pipe P10 is sent to the powder carbon producer 178.

In the carbon immobilization part 178B, the carbon dioxide gas sent from the condenser 26 and the hydrogen gas sent from the water electrolyzer 170 are supplied to cause the reduction reaction as expressed by the formula (5) described above.

In order to start the above reaction, it is necessary to increase an ambient temperature; however, since heat is generated by the reaction, it is not necessary to apply heat from the outside once the reaction is started.

When the powder carbon producer 178 is started, first, hydrogen gas and oxygen gas are supplied to the gas flow path 178A and ignited. When a combustion flame generated by combustion reaction between the hydrogen gas and the oxygen gas and high heat exhaust gas (water vapor) pass through the gas flow path 178A, the heat of the combustion flame and the exhaust gas are transmitted to the carbon immobilization part 178B via the partition wall 173. The exhaust gas (water vapor) is discharged from an end of the gas flow path 178A.

Since the gas flow path 178A of the present embodiment is formed in a spiral shape in the cylinder axis direction of the powder carbon producer 178 and has a long flow path length, the heat of the combustion flame and the exhaust gas can be sufficiently applied to the carbon immobilization part 178B over time. As a result, the reduction reaction as expressed by the formula (5) can be reliably caused.

When heat is generated by the reaction of the formula (5) after ignition, the supply of the oxygen gas and the hydrogen gas to the gas flow path 178A is stopped.

In the carbon immobilization part 178B having a high temperature, the carbon dioxide gas and the hydrogen gas are continuously supplied, so that powder carbon ("C" in the formula (5)) can be continuously produced. The produced powder carbon can be taken out from below the carbon immobilization part 178B. Water vapor ($H_2O$ in the formula (5)) generated by the reaction between the carbon dioxide gas and the hydrogen gas is discharged from below the carbon immobilization part 178B. The water vapor discharged from the carbon immobilization part 178B is sent to the condenser 26 through the pipe P117, and cooled by the condenser 26 to become water.

In the fuel cell power generation system 10B of the present embodiment, the first fuel cell stack 12 and from the second fuel cell stack 14 to the carbon producer 166 are continuously connected and provided on-site, so that the carbon powder can be continuously efficiently produced during power generation.

Unless the powder carbon is ignited and burned, the powder carbon is not released as carbon dioxide gas into the atmosphere, and the release of the carbon dioxide gas into the atmosphere can be suppressed.

The powder carbon is easily transported to a storage site, and it is possible to stably immobilize carbon for a long period of time only by burying and disposing the powder carbon underground or open-air storing the powder carbon on the ground unless the powder carbon is placed under conditions where there are both an ignition source and oxygen. The produced powder carbon can also be used as carbon black or the like in commerce and industry.

In fuel cell power generation system 10B of the present embodiment, although the powder carbon is produced from the carbon dioxide gas, a carbon product manufacturing apparatus 184 that converts the powder carbon into graphite, carbon nanotube, diamond, or the like may be further added. In the carbon product manufacturing apparatus 184, for example, the recovered powder carbon is placed in a high-temperature (electric heater temperature rise) and high-pressure (electric high-pressure press) environment by utilizing the electric power generated by the fuel cell power generation system 10B, electric power by renewable energy, or the like, so that a powder of synthetic diamond can be obtained by a known technique. For example, from the recovered powder carbon, a carbon nanotube can be obtained by a known technique such as an arc discharge method, a laser ablation method, or a CVD method by utilizing the electric power generated by the fuel cell power generation system 10B, the electric power by renewable energy, or the like. From the recovered powder carbon, graphite can be obtained by a known technique using the electric power generated by the fuel cell power generation system 10B, the electric power by renewable energy, or the like.

When the carbon powder is graphite, a carbon nanotube, or diamond powder, the carbon powder is not easily burned even if there is an ignition source or oxygen. Even if the carbon powder is open-air stored on the ground, the carbon can be fixed safely and stably for a long period of time, a restriction of a storage place is eliminated, and the energy loss and cost of transportation and press-fitting can be reduced. In commerce and industry, graphite can also be used as a lead of a pencil, a brake pad for an automobile, or the like, a carbon nanotube can also be used as a semiconductor or a structural material, and synthetic diamond powder can also be used as a blade material of a diamond cutter for construction or a machine tool, or the like.

The carbon product manufacturing apparatus 184 is also a part of the carbon producer 166, and is provided on-site in the fuel cell power generation system 10B. A product produced using the powder carbon is not limited to the above-described carbon products, and carbon materials such as carbon nanohorns and fullerenes may be produced by a known technique and used in commerce and industry.

In the powder carbon producer 178 of the present embodiment, the outside is the gas flow path 178A, and the inside is the carbon immobilization part 178B. However, the inside may be the carbon immobilization part 178B as a spiral flow path, and the outside may be carbon immobilization part 178B.

Third Embodiment

Next, a third embodiment of the present invention will be described. In the present embodiment, the same components as those of the first and second embodiments are denoted by the same reference numerals, and detailed description thereof will be omitted.

A fuel cell power generation system 10C of the present embodiment is mainly different from that of the first embodiment in that a third heat exchanger 34 and a condenser 35 are provided in a path of a first fuel electrode off-gas pipe P7.

Figure 7:
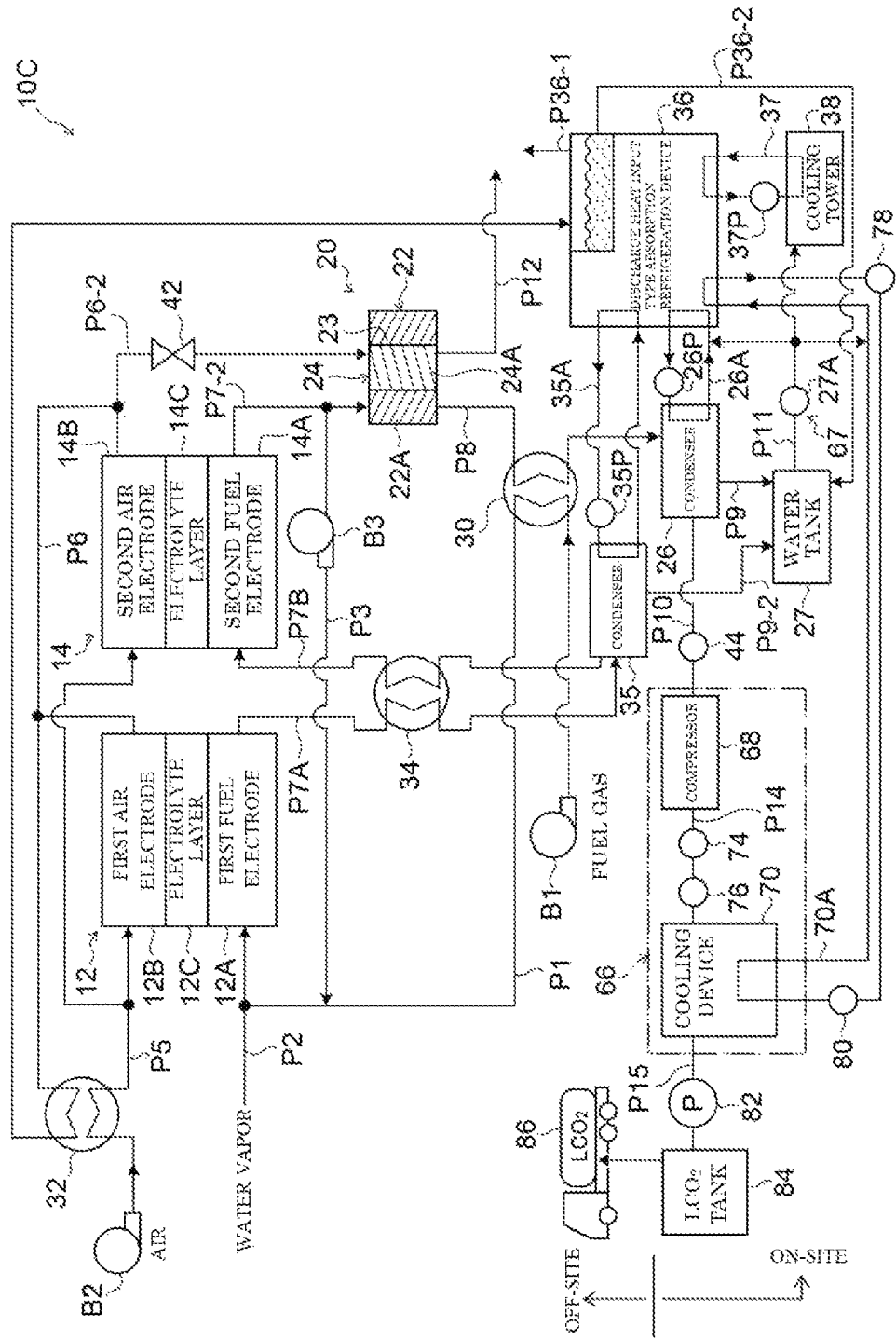
FIG. 7 is a schematic diagram of a fuel cell power generation system according to a third embodiment.

As illustrated in FIG. 7, the first fuel electrode off-gas pipe P7 extends from a first fuel electrode 12A and is connected to the condenser 35 via the third heat exchanger 34. The first fuel electrode off-gas pipe P7 from the first fuel electrode 12A to the condenser 35 is denoted by reference sign P7A. The first fuel electrode off-gas pipe P7A extends from a gas-side outlet of the condenser 35 and is connected to a second fuel electrode 14A via the third heat exchanger 34. The first fuel electrode off-gas pipe P7 from the condenser 35 to the second fuel electrode 14A is denoted by reference sign P7B. One end of a water pipe P9-2 is connected to a liquid-side outlet of the condenser 35. The other end of the water pipe P9-2 is connected to a water tank 27. The condenser 35 is provided with a cooling water circulation flow path 35A, and cooling water from a discharge heat input type absorption refrigeration device 36 is circulated and supplied by driving of a pump 35P. As a result, a first fuel electrode off-gas is cooled, and water vapor in the first fuel electrode off-gas is condensed. The condensed water is sent to the water tank 27 via a water pipe P9-2.

Operation and Advantageous Effects

Next, an operation of the fuel cell power generation system 10C of the present embodiment will be described.

Also in the present embodiment, similarly to the fuel cell power generation system 10A of the first embodiment, power generation is performed in the first fuel cell stack 12. The first fuel electrode off-gas sent from the first fuel electrode 12A to a first fuel electrode off-gas pipe P7-1 is cooled by heat exchange with regenerated fuel gas described later in the third heat exchanger 34, and is supplied to the condenser 35. In the condenser 35, the first fuel electrode off-gas is further cooled by the cooling water circulating through the cooling water circulation flow path 35A, and water vapor in the first fuel electrode off-gas is condensed. Here, the temperature of the cooling water circulating through the cooling water circulation flow path 35A is set such that water vapor in the first fuel electrode off-gas is condensed to such an extent that the amount of water vapor remaining in the regenerated fuel gas improves the power generation efficiency in the second fuel cell stack 14. The condensed water is sent to the water tank 27 via a water pipe P9-2.

The first fuel electrode off-gas from which condensed water has been separated is sent as the regenerated fuel gas to the first fuel electrode off-gas pipe P7B, heated by heat exchange with the first fuel electrode off-gas before water is separated by the third heat exchanger 34, and supplied to the second fuel electrode 14A. In the second fuel cell stack 14, electric power is generated similarly to the fuel cell power generation system 10A of the first embodiment.

In the present embodiment, since the regenerated fuel gas generated by separating a portion of water vapor from the first fuel electrode off-gas is supplied to the second fuel electrode 14A, the power generation efficiency in the second fuel cell stack 14 can be improved.

Also in the present embodiment, in the oxidation reactor 24 of the oxidation reactor 20 with a hydrogen permeable membrane, water vapor is generated by the oxidation reaction between hydrogen that has permeated through the hydrogen permeable membrane 23 and oxygen. Therefore, hydrogen can be reduced from the second fuel electrode off-gas to recover high concentration carbon dioxide, and liquefied carbon dioxide can be efficiently obtained.

Fourth Embodiment

Next, a fourth embodiment of the present invention will be described. In the present embodiment, the same components as those of the first to third embodiments are denoted by the same reference numerals, and detailed description thereof will be omitted.

Figure 8:
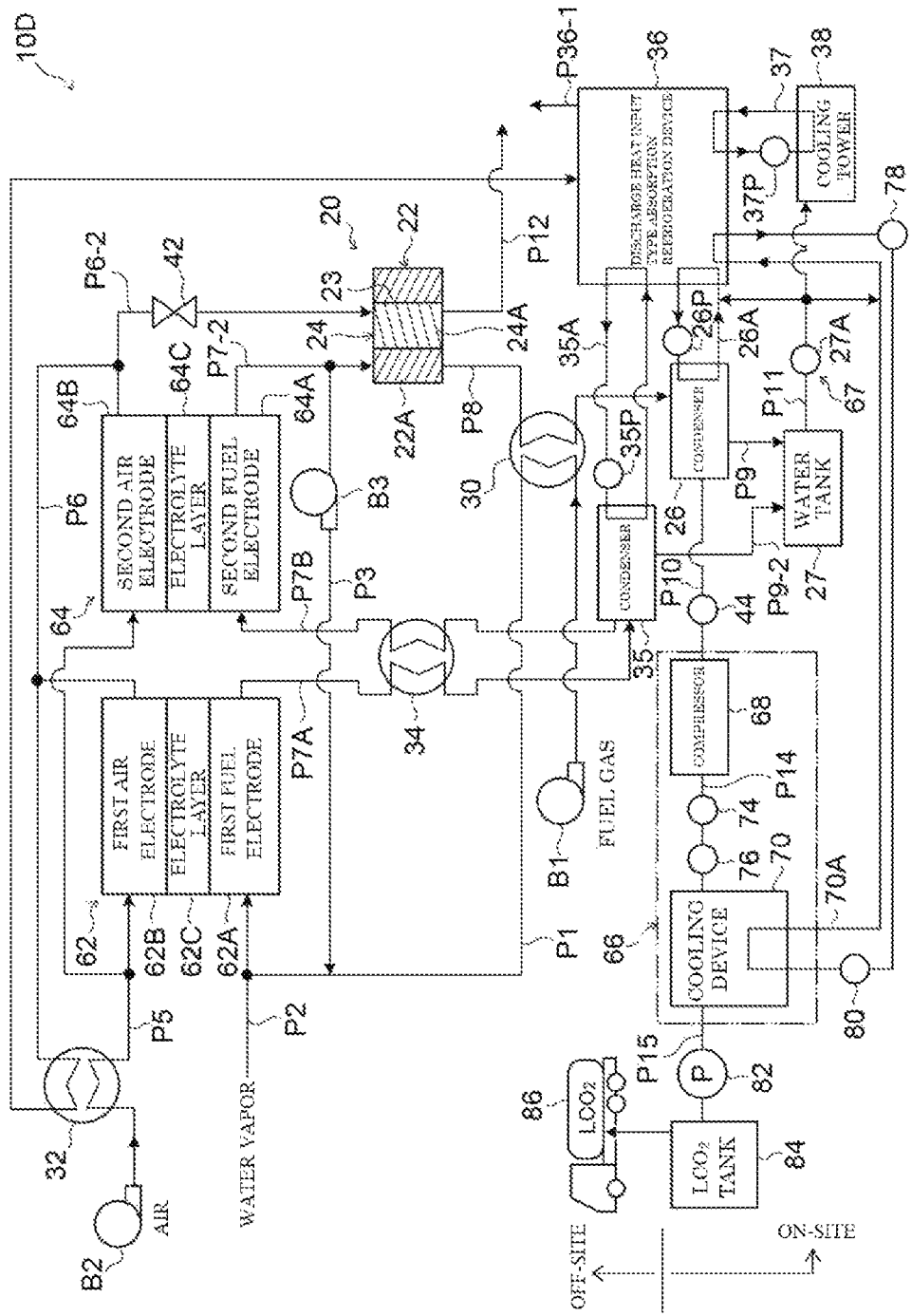
FIG. 8 is a schematic diagram of a fuel cell power generation system according to a fourth embodiment.

As illustrated in FIG. 8, in a fuel cell power generation system 10D of the present embodiment, a first fuel cell stack 62 and a second fuel cell stack 64 use a solid oxide fuel cell (SOFC) instead of the hydrogen ion conduction type solid oxide fuel cell of the first embodiment. Therefore, a reaction occur as follows at a first fuel electrode 62A (fuel electrode) and a first air electrode 62B (air electrode). The same applies to a second fuel electrode 64A and a second air electrode 64B.

In the first air electrode 62B, as expressed by the following formula (6), oxygen in oxidant gas reacts with electrons to generate oxygen ions. The generated oxygen ions reach the first fuel electrode 62A of the first fuel cell stack 62 through an electrolyte layer 62C.

(Air Electrode Reaction)

$$\tfrac{1}{2}O_2 + 2e^- \rightarrow O^{2-} \qquad (6)$$

On the other hand, in the first fuel electrode 62A of the first fuel cell stack 62, as expressed by the following formulas (7) and (8), oxygen ions that have passed through the electrolyte layer 62C react with hydrogen and carbon monoxide in the fuel gas, and water vapor, carbon dioxide, and electrons are generated. The electrons generated at the first fuel electrode 62A move from the first fuel electrode 62A to the first air electrode 62B through an external circuit, whereby electric power is generated (Fuel Electrode Reaction)

$$H_2 + O^{2-} \rightarrow H_2O + 2e^- \qquad (7)$$

$$CO + O^{2-} \rightarrow CO_2 + 2e^- \qquad (8)$$

In the solid oxide fuel cell, since water vapor is generated at the first fuel electrode 62A and the second fuel electrode 64A, the amount of water vapor contained in the first fuel electrode off-gas and the second fuel electrode off-gas is larger than that in the hydrogen ion conduction type solid oxide fuel cell. On the other hand, water vapor is not generated at the first air electrode 62B and the second air electrode 64B. The air electrode off-gas supplied to the discharge heat input type absorption refrigeration device 36 is discharged from an exhaust pipe P36-1 after heat exchange.

In the fuel cell power generation system 10D of the present embodiment, the other configurations are the same as those of the third embodiment, and a third heat exchanger 34 and a condenser 35 are provided in a path of a first fuel electrode off-gas pipe P7. Here, since the amount of water vapor contained in the first fuel electrode off-gas and the second fuel electrode off-gas is larger than that in the fuel cell power generation system 10C, the temperature of the cooling water circulating through a cooling water circulation flow path 35A is set such that the amount of water vapor removed by condensation in the condenser 35 increases. The condensed water is sent to the water tank 27 via a water pipe P9-2.

In the present embodiment, since the regenerated fuel gas generated by separating a portion of water vapor from the first fuel electrode off-gas is supplied to the second fuel electrode 14A, the power generation efficiency in the second fuel cell stack 64 can be improved.

Also in the present embodiment, in the oxidation reactor 24 of the oxidation reactor 20 with a hydrogen permeable membrane, water vapor is generated by the oxidation reaction between hydrogen that has permeated through the hydrogen permeable membrane 23 and oxygen. Therefore, hydrogen can be reduced from the second fuel electrode off-gas to recover high concentration carbon dioxide, and liquefied carbon dioxide can be efficiently obtained.

Other Embodiments

Although one embodiment of the fuel cell power generation system of the present invention has been described above, the present invention is not limited to the above embodiment, and it is a matter of course that various modifications can be made without departing from the gist of the present invention.

In the present invention, other fuel cells such as a molten carbonate fuel cell (MCFC), a phosphoric acid fuel cell (PAFC), and a solid polymer fuel cell (PEFC) can also be used as the fuel cell.

The fuel cell in the fuel cell power generation system of the present invention may be a fuel cell including an air electrode, an electrolyte, and a fuel electrode, or may be a fuel cell stack in which a plurality of fuel cells are stacked.

For example, the fuel cell power generation system of the present invention is not limited to the configuration including two fuel cells, and may be configured to include one fuel cell or three or more fuel cells. When the fuel cell power generation system of the present invention includes a plurality of fuel cells, fuel electrodes in the plurality of fuel cells are arranged in series, the fuel electrode off-gas discharged from the fuel electrode on a more upstream side may be supplied to the fuel electrode on a more downstream side, the fuel electrode off-gas discharged from the fuel electrode on the most downstream side may be supplied to the first flow path, and the air electrode off-gas discharged from at least any one of the air electrodes in the plurality of fuel cells may be supplied to the second flow path.

The gas sent from the first flow path is not limited to the gas in which all the unreacted fuel gas is oxidized, and may be a gas containing a part of the unreacted fuel gas.

The disclosure of Japanese Patent Application No. 2019-008561, filed on Jan. 22, 2019, is incorporated herein by reference in its entirety.

All publications, patent applications, and technical standards mentioned in this description are incorporated herein by reference to the same extent as if each individual publication, patent application, or technical standard was specifically and individually indicated to be incorporated by reference.

REFERENCE SIGNS LIST 10A, 10B, 10C, 10D fuel cell power generation system
12, 62 first fuel cell stack (fuel cell)
12A, 62A first fuel electrode (fuel electrode)
12B, 62B first air electrode (air electrode)
14, 64 second fuel cell stack (fuel cell)
14A, 64A second fuel electrode (fuel electrode)
14B, 64B second air electrode (air electrode)
20 oxidation reactor with hydrogen permeable membrane (reaction device)
22A hydrogen separation space (first flow path)
23 hydrogen permeable membrane
23C reaction catalyst membrane (catalyst)
24A air flow path (second flow path)
26 condenser (water vapor separator)
68 compressor
70 cooling device (liquefaction device)
170 water electrolyzer
178 powder carbon producer (carbon producer)

The invention claimed is:

1. A reaction device comprising:
a first flow path to which a fuel gas is supplied;
a second flow path to which a gas containing oxygen is supplied;
a hydrogen permeable membrane that separates the first flow path and the second flow path and allows hydrogen contained in the fuel gas supplied to the first flow path to permeate toward the second flow path; and
a catalyst that is provided in the second flow path and promotes an oxidation reaction between the oxygen and hydrogen passing through the hydrogen permeable membrane,
wherein the hydrogen permeable membrane comprises a barium zirconium oxide membrane.

2. The reaction device according to claim 1, wherein the barium zirconium oxide membrane is a membrane obtained by doping barium zirconium oxide with at least one metal oxide containing at least one metal selected from the group consisting of yttrium (Y), ytterbium (Yb), selenium (Se), strontium (Sr), scandium (Sc), gadolinium (Gd), and indium (In).

3. The reaction device according to claim 2, wherein a molar ratio (barium zirconium oxide/metal constituting metal oxide) of the barium zirconium oxide to the metal constituting the metal oxide in the barium zirconium oxide membrane is from 70/30 to 90/10.

4. The reaction device according to claim 1, wherein, in the barium zirconium oxide membrane, a surface on a side of the first flow path and a surface on a side of the second flow path are electrically short-circuited.

5. The reaction device according to claim 4, wherein:
the barium zirconium oxide membrane has a microvia structure penetrating the surface on the first flow path side and the surface on the second flow path side, a material having electron conductivity is embedded in the microvia structure, and the surface on the first flow path side and the surface on the second flow path side are internally short-circuited, or
the reaction device further comprises a current collector on the surface on the first flow path side and the surface on the second flow path side, and the surface on the first flow path side and the surface on the second flow path side are externally short-circuited.

6. The reaction device according to claim 1, wherein the catalyst is stacked on a second flow path side of the hydrogen permeable membrane.

7. A fuel cell power generation system comprising:
the reaction device according to claim 1; and
a fuel cell which comprises a fuel electrode, an air electrode, and an electrolyte layer disposed between the fuel electrode and the air electrode and in which power is generated by the fuel gas supplied to the fuel electrode and an oxidant gas supplied to the air electrode and containing oxygen, a fuel electrode off-gas containing unreacted fuel gas is discharged from the fuel electrode, and an air electrode off-gas containing oxygen is discharged from the air electrode,
wherein the fuel electrode off-gas is supplied to the first flow path, and the air electrode off-gas is supplied to the second flow path, and
wherein, in the second flow path of the reaction device, the oxygen and hydrogen passing through the hydrogen permeable membrane undergo an oxidation reaction to generate water, and unreacted hydrogen is separated from the fuel electrode off-gas.

8. The fuel cell power generation system according to claim 7, comprising a plurality of fuel cells,
wherein fuel electrodes in the plurality of fuel cells are arranged in series, and fuel electrode off-gas discharged from a fuel electrode on a more upstream side is supplied to a fuel electrode on a more downstream side, and
wherein fuel electrode off-gas discharged from a fuel electrode on a most downstream side is supplied to the first flow path, and air electrode off-gas discharged from at least any one of air electrodes in the plurality of fuel cells is supplied to the second flow path.

9. The fuel cell power generation system according to claim 7, further comprising a water vapor separator that separates water vapor from a gas discharged from the first flow path of the reaction device.

10. The fuel cell power generation system according to claim 7, further comprising:
a power generator that generates power using renewable energy;
a water electrolyzer that electrolyzes water using the power generated by power generation in the power generator; and
a carbon producer that produces carbon by a reduction reaction between hydrogen produced by the water electrolyzer and carbon dioxide contained in a gas discharged from the first flow path of the reaction device.

11. The fuel cell power generation system according to claim 7, further comprising:
a compressor that compresses carbon dioxide contained in a gas discharged from the first flow path of the reaction device; and
a liquefaction device that liquefies the carbon dioxide compressed by the compressor.

12. The reaction device according to claim 2, wherein, in the barium zirconium oxide membrane, a surface on a side of the first flow path and a surface on a side of the second flow path are electrically short-circuited.

13. The reaction device according to claim 3, wherein, in the barium zirconium oxide membrane, a surface on a side of the first flow path and a surface on a side of the second flow path are electrically short-circuited.

14. The reaction device according to claim 12, wherein:
the barium zirconium oxide membrane has a microvia structure penetrating the surface on the first flow path side and the surface on the second flow path side, a material having electron conductivity is embedded in the microvia structure, and the surface on the first flow path side and the surface on the second flow path side are internally short-circuited, or the reaction device further comprises a current collector on the surface on the first flow path side and the surface on the second flow path side, and the surface on the first flow path side and the surface on the second flow path side are externally short-circuited.

15. The reaction device according to claim 13, wherein:
the barium zirconium oxide membrane has a microvia structure penetrating the surface on the first flow path side and the surface on the second flow path side, a material having electron conductivity is embedded in the microvia structure, and the surface on the first flow path side and the surface on the second flow path side are internally short-circuited, or the reaction device further comprises a current collector on the surface on the first flow path side and the surface on the second flow path side, and the surface on the first flow path side and the surface on the second flow path side are externally short-circuited.

16. The reaction device according to claim 2, wherein the catalyst is stacked on a second flow path side of the hydrogen permeable membrane.

17. The reaction device according to claim 3, wherein the catalyst is stacked on a second flow path side of the hydrogen permeable membrane.

18. The reaction device according to claim 4, wherein the catalyst is stacked on a second flow path side of the hydrogen permeable membrane.

19. The reaction device according to claim 5, wherein the catalyst is stacked on a second flow path side of the hydrogen permeable membrane.

20. A fuel cell power generation system comprising:
the reaction device according to claim 2; and
a fuel cell which comprises a fuel electrode, an air electrode, and an electrolyte layer disposed between the fuel electrode and the air electrode and in which power is generated by the fuel gas supplied to the fuel electrode and an oxidant gas supplied to the air electrode and containing oxygen, a fuel electrode off-gas containing unreacted fuel gas is discharged from the fuel electrode, and an air electrode off-gas containing oxygen is discharged from the air electrode,
wherein the fuel electrode off-gas is supplied to the first flow path, and the air electrode off-gas is supplied to the second flow path, and
wherein, in the second flow path of the reaction device, the oxygen and hydrogen passing through the hydrogen permeable membrane undergo an oxidation reaction to generate water, and unreacted hydrogen is separated from the fuel electrode off-gas.

\* \* \* \* \*